US012656983B2

(12) United States Patent
Shibuya

(10) Patent No.: US 12,656,983 B2
(45) Date of Patent: Jun. 16, 2026

(54) INFORMATION PROCESSING APPARATUS CAPABLE OF DISPLAYING A PRINT SETTING SCREEN, CONTROL METHOD, AND STORAGE MEDIUM THEREFOR

(71) Applicant: CANON KABUSHIKI KAISHA, Tokyo (JP)

(72) Inventor: Yoichiro Shibuya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 18/486,074

(22) Filed: Oct. 12, 2023

(65) Prior Publication Data

US 2024/0126490 A1    Apr. 18, 2024

(30) Foreign Application Priority Data

Oct. 14, 2022    (JP) ................................. 2022-165310

(51) Int. Cl.
*G06F 3/12* (2006.01)

(52) U.S. Cl.
CPC .......... *G06F 3/1258* (2013.01); *G06F 3/1205* (2013.01); *G06F 3/1228* (2013.01)

(58) Field of Classification Search
CPC .... G06F 3/1258; G06F 3/1205; G06F 3/1228; G06F 3/1255; G06F 3/1256; G06F 3/1253; G06F 3/1203
See application file for complete search history.

(56) References Cited

U.S. PATENT DOCUMENTS

| | | | | |
|---|---|---|---|---|
| 10,956,095 | B2 * | 3/2021 | Takeo ................... | G06F 3/1255 |
| 11,010,105 | B2 * | 5/2021 | Kaneda ................. | G06F 3/1255 |
| 2012/0224207 | A1 * | 9/2012 | Sueshige .............. | G06F 3/1255 |
| | | | | 358/1.13 |
| 2016/0266855 | A1 * | 9/2016 | Mitsui ................... | G06F 3/1255 |
| 2018/0246690 | A1 | 8/2018 | Saigusa | |
| 2019/0258436 | A1 * | 8/2019 | Oyamatsu ............. | G06F 3/1255 |
| 2019/0317710 | A1 * | 10/2019 | Saito ..................... | G06F 3/1255 |
| 2020/0034084 | A1 * | 1/2020 | Kawano ................. | G06F 3/1255 |
| 2022/0317943 | A1 * | 10/2022 | Kawasaki ............. | G06F 3/1205 |
| 2023/0078388 | A1 * | 3/2023 | Hidaka ................. | G06F 3/1255 |
| | | | | 358/1.15 |

FOREIGN PATENT DOCUMENTS

JP        2019074906 A    5/2019

\* cited by examiner

*Primary Examiner* — Juan M Guillermety
(74) *Attorney, Agent, or Firm* — Canon U.S.A., Inc. IP Divison

(57)    ABSTRACT

A control method for an information processing apparatus storing a print setting application for displaying a print setting screen, the print setting application being stored in association with a standard printer driver provided by the information processing apparatus, the control method being implemented by executing the print setting application, the control method includes obtaining a print setting made via another print setting screen provided by software different from the print setting application, determining whether the obtained print setting includes a combination of setting values matching conflict information, and performing control processing based on a result of the determination in a case where it is determined that the print setting includes the combination of setting values matching the conflict information.

12 Claims, 21 Drawing Sheets

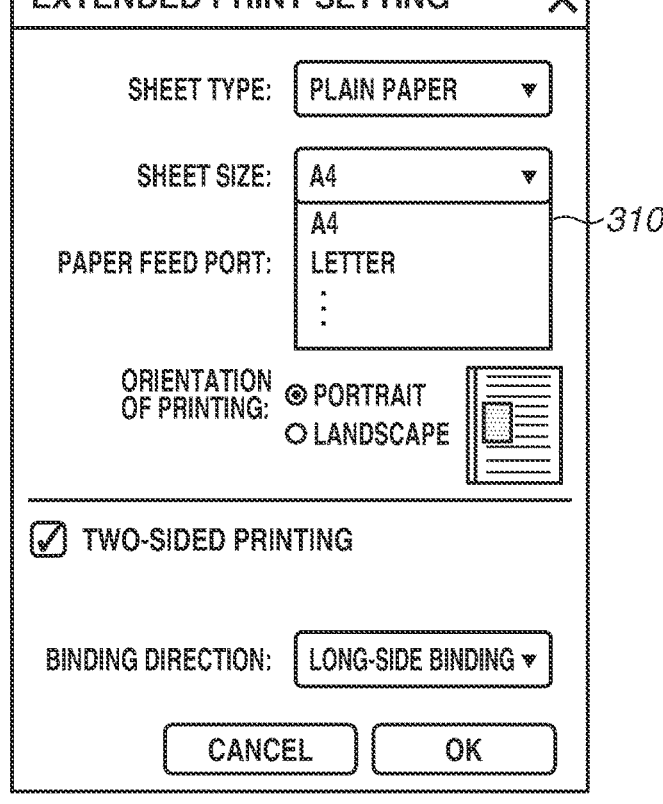

EXTENDED PRINT SETTING                    ✕

SHEET TYPE:      PLAIN PAPER      ▼  —*302*

SHEET SIZE:      A4              ▼  —*303*

PAPER FEED PORT:   AUTOMATIC       ▼  —*304*

*305*

ORIENTATION
OF PRINTING:    ◉ PORTRAIT
                ○ LANDSCAPE

☑ TWO-SIDED PRINTING ～*306*

BINDING DIRECTION:   LONG-SIDE BINDING ▼  —*307*

*309*～  CANCEL          OK   —*308*

FIG.3B

EXTENDED PRINT SETTING                    ✕

SHEET TYPE:      PLAIN PAPER      ▼

SHEET SIZE:      A4              ▼

A4
PAPER FEED PORT:  LETTER              —*310*
                 ⋮

ORIENTATION
OF PRINTING:    ◉ PORTRAIT
                ○ LANDSCAPE

☑ TWO-SIDED PRINTING

BINDING DIRECTION:   LONG-SIDE BINDING ▼

CANCEL          OK

FIG.3C

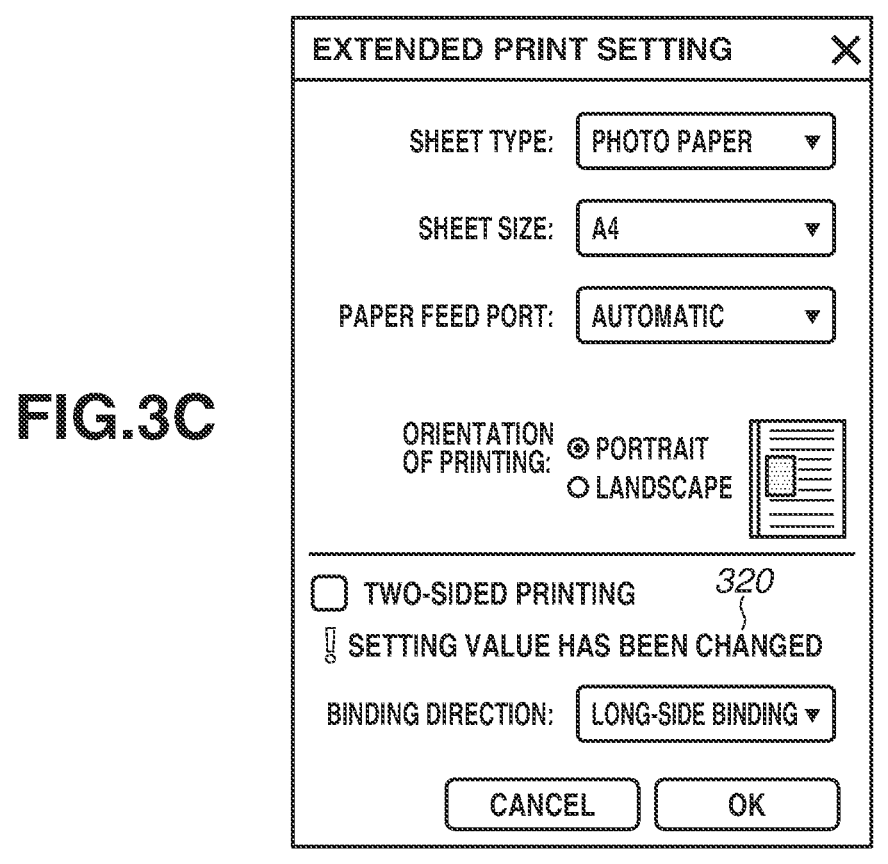

EXTENDED PRINT SETTING    ✕

SHEET TYPE:    PHOTO PAPER    ▼

SHEET SIZE:    A4    ▼

PAPER FEED PORT:    AUTOMATIC    ▼

ORIENTATION OF PRINTING:    ⊙ PORTRAIT
⃝ LANDSCAPE

☐ TWO-SIDED PRINTING    *320*

⫿ SETTING VALUE HAS BEEN CHANGED

BINDING DIRECTION:    LONG-SIDE BINDING ▼

CANCEL    OK

FIG.6

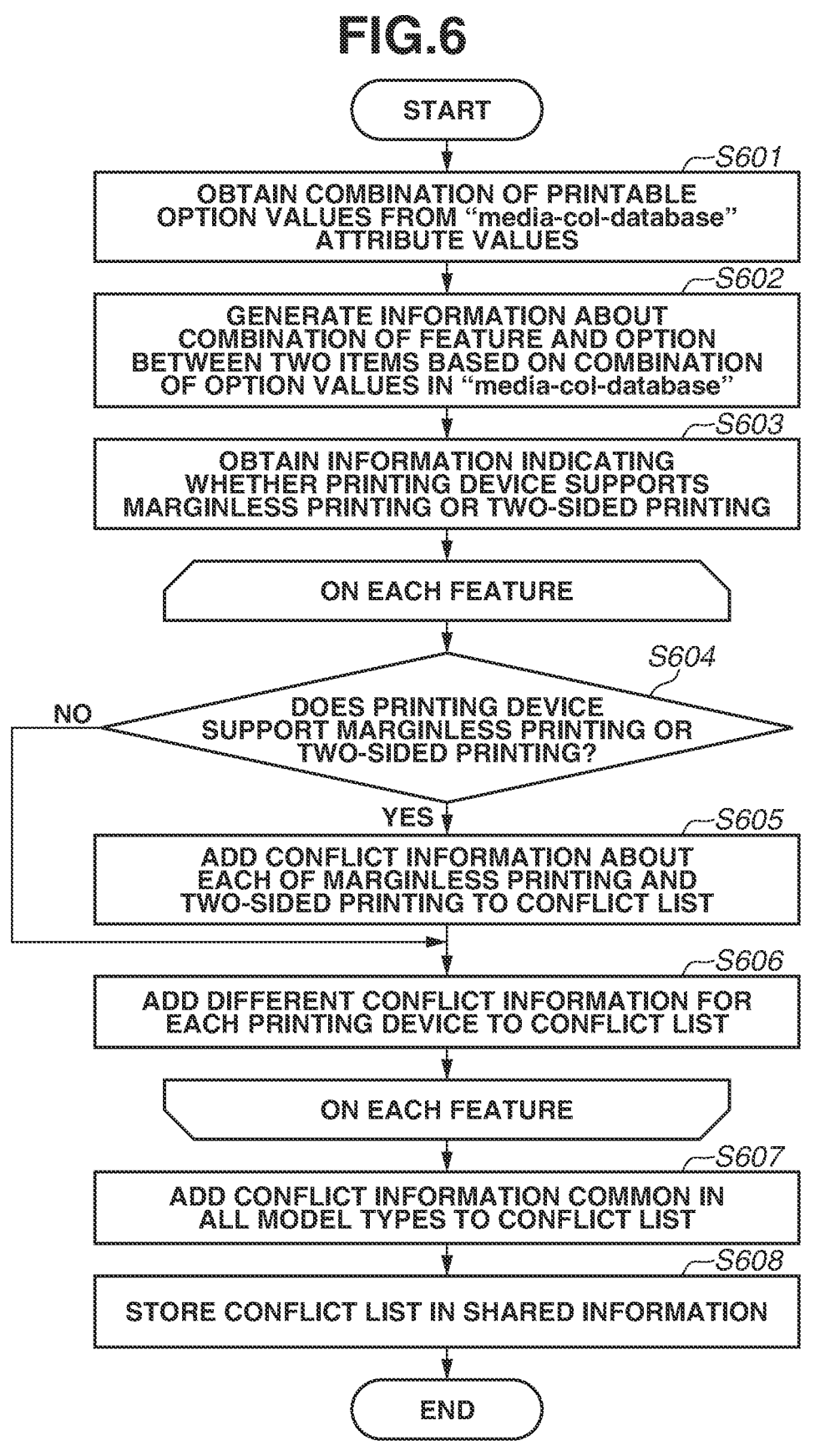

START

*S601*

OBTAIN COMBINATION OF PRINTABLE
OPTION VALUES FROM "media-col-database"
ATTRIBUTE VALUES

*S602*

GENERATE INFORMATION ABOUT
COMBINATION OF FEATURE AND OPTION
BETWEEN TWO ITEMS BASED ON COMBINATION
OF OPTION VALUES IN "media-col-database"

*S603*

OBTAIN INFORMATION INDICATING
WHETHER PRINTING DEVICE SUPPORTS
MARGINLESS PRINTING OR TWO-SIDED PRINTING

ON EACH FEATURE

*S604*

DOES PRINTING DEVICE
SUPPORT MARGINLESS PRINTING OR
TWO-SIDED PRINTING?

NO

YES

*S605*

ADD CONFLICT INFORMATION ABOUT
EACH OF MARGINLESS PRINTING AND
TWO-SIDED PRINTING TO CONFLICT LIST

*S606*

ADD DIFFERENT CONFLICT INFORMATION FOR
EACH PRINTING DEVICE TO CONFLICT LIST

ON EACH FEATURE

*S607*

ADD CONFLICT INFORMATION COMMON IN
ALL MODEL TYPES TO CONFLICT LIST

*S608*

STORE CONFLICT LIST IN SHARED INFORMATION

END

| SIZE | PAPER FEED PORT | MEDIA |
|------|-----------------|-------|
| A4 | AUTOMATIC | PLAIN PAPER |
| A4 | AUTOMATIC | PHOTO PAPER |
| A4 | AUTOMATIC | ENVELOPE |
| A4 | MAIN TRAY | PLAIN PAPER |
| A4 | REAR TRAY | PLAIN PAPER |
| A4 | REAR TRAY | PHOTO PAPER |
| A4 | REAR TRAY | ENVELOPE |
| A4 | REAR TRAY | GLOSSY GOLD |
| A4 | REAR TRAY | MATTE PHOTO PAPER |
| LETTER | AUTOMATIC | PLAIN PAPER |
| LETTER | AUTOMATIC | PHOTO PAPER |
| LETTER | AUTOMATIC | ENVELOPE |
| LETTER | MAIN TRAY | PLAIN PAPER |
| LETTER | REAR TRAY | PLAIN PAPER |
| LETTER | REAR TRAY | PHOTO PAPER |
| . . . | . . . | . . . |

FIG.8

| FUNCTION 1 | FUNCTION 2 |
|---|---|
| MEDIA, ENVELOPE | MARGINLESS PRINTING, ON |
| MEDIA, PHOTO PAPER | TWO-SIDED PRINTING, TWO-SIDED (LONG-SIDE BINDING) |
| MEDIA, PHOTO PAPER | TWO-SIDED PRINTING, TWO-SIDED (SHORT-EDGE BINDING) |
| MEDIA, GLOSSY GOLD | PAPER FEED PORT, MAIN TRAY |
| MARGINLESS PRINTING, ON | TWO-SIDED PRINTING, TWO-SIDED (LONG-SIDE BINDING) |
| MARGINLESS PRINTING, ON | TWO-SIDED PRINTING, TWO-SIDED (SHORT-EDGE BINDING) |
| TWO-SIDED (LONG-SIDE BINDING) | PRINT FROM LAST PAGE |
| TWO-SIDED (SHORT-EDGE BINDING) | PRINT FROM LAST PAGE |
| . . . | . . . |

Figure 14:
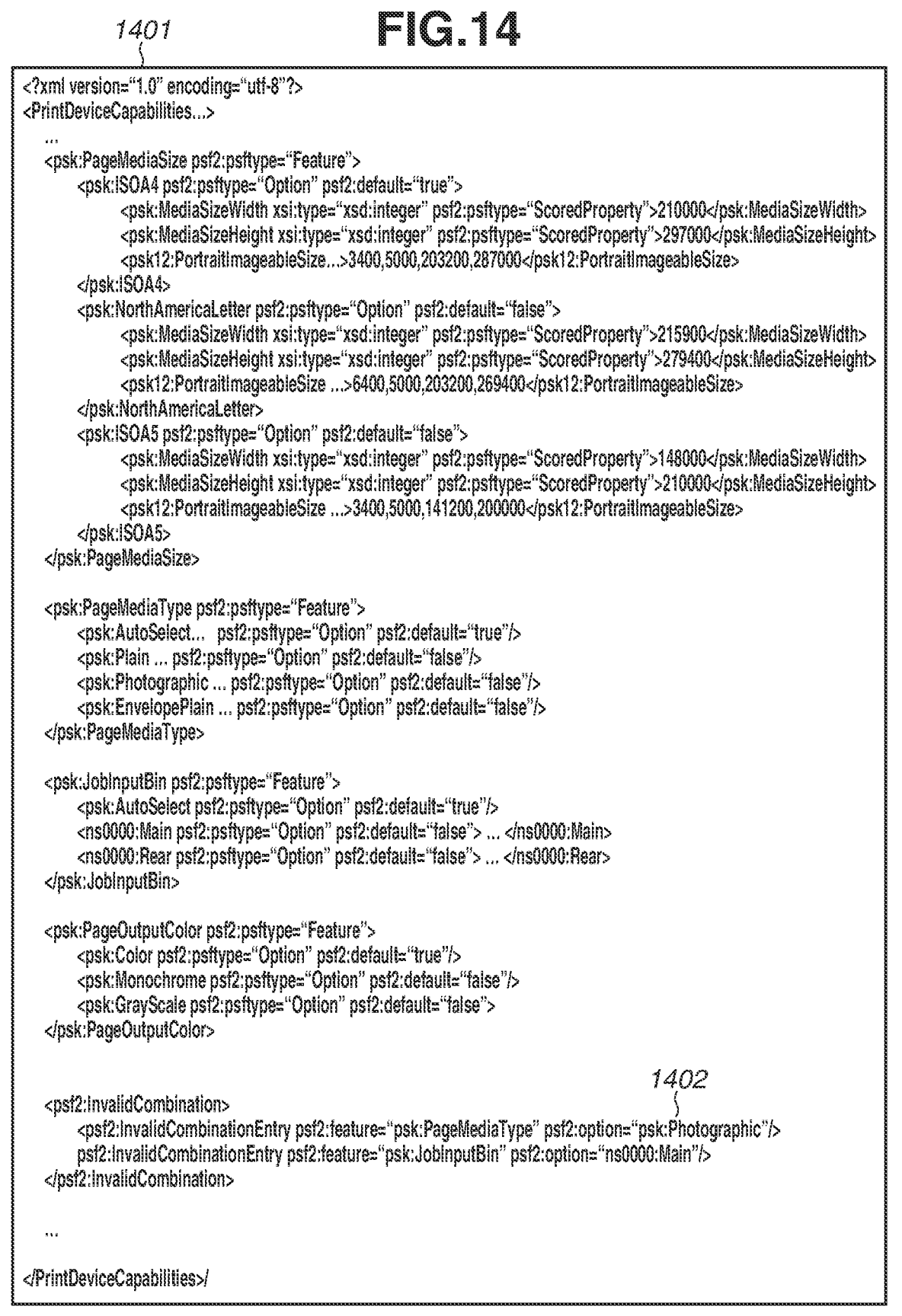

```xml
<?xml version="1.0" encoding="utf-8"?>
<PrintDeviceCapabilities...>

...

<psk:PageMediaSize psf2:psftype="Feature">
        <psk:ISOA4 psf2:psftype="Option" psf2:default="true">
            <psk:MediaSizeWidth xsi:type="xsd:integer" psf2:psftype="ScoredProperty">210000</psk:MediaSizeWidth>
            <psk:MediaSizeHeight xsi:type="xsd:integer" psf2:psftype="ScoredProperty">297000</psk:MediaSizeHeight>
            <psk12:PortraitImageableSize...>3400,5000,203200,287000</psk12:PortraitImageableSize>
        </psk:ISOA4>
        <psk:NorthAmericaLetter psf2:psftype="Option" psf2:default="false">
            <psk:MediaSizeWidth xsi:type="xsd:integer" psf2:psftype="ScoredProperty">215900</psk:MediaSizeWidth>
            <psk:MediaSizeHeight xsi:type="xsd:integer" psf2:psftype="ScoredProperty">279400</psk:MediaSizeHeight>
            <psk12:PortraitImageableSize ...>6400,5000,203200,269400</psk12:PortraitImageableSize>
        </psk:NorthAmericaLetter>
        <psk:ISOA5 psf2:psftype="Option" psf2:default="false">
            <psk:MediaSizeWidth xsi:type="xsd:integer" psf2:psftype="ScoredProperty">148000</psk:MediaSizeWidth>
            <psk:MediaSizeHeight xsi:type="xsd:integer" psf2:psftype="ScoredProperty">210000</psk:MediaSizeHeight>
            <psk12:PortraitImageableSize ...>3400,5000,141200,200000</psk12:PortraitImageableSize>
        </psk:ISOA5>
    </psk:PageMediaSize>

<psk:PageMediaType psf2:psftype="Feature">
        <psk:AutoSelect...   psf2:psftype="Option" psf2:default="true"/>
        <psk:Plain ... psf2:psftype="Option" psf2:default="false"/>
        <psk:Photographic ... psf2:psftype="Option" psf2:default="false"/>
        <psk:EnvelopePlain ... psf2:psftype="Option" psf2:default="false"/>
    </psk:PageMediaType>

<psk:JobInputBin psf2:psftype="Feature">
        <psk:AutoSelect psf2:psftype="Option" psf2:default="true"/>
        <ns0000:Main psf2:psftype="Option" psf2:default="false"> ... </ns0000:Main>
        <ns0000:Rear psf2:psftype="Option" psf2:default="false"> ... </ns0000:Rear>
    </psk:JobInputBin>

<psk:PageOutputColor psf2:psftype="Feature">
        <psk:Color psf2:psftype="Option"  psf2:default="true"/>
        <psk:Monochrome psf2:psftype="Option" psf2:default="false"/>
        <psk:GrayScale psf2:psftype="Option" psf2:default="false">
    </psk:PageOutputColor>

1402

<psf2:InvalidCombination>
        <psf2:InvalidCombinationEntry psf2:feature="psk:PageMediaType" psf2:option="psk:Photographic"/>
        psf2:InvalidCombinationEntry psf2:feature="psk:JobInputBin" psf2:option="ns0000:Main"/>
    </psf2:InvalidCombination>

...

</PrintDeviceCapabilities>/
```

```
<?xml version="1.0" encoding="utf-8"?>
<PrintDeviceCapabilities...>

...

<psk:PageMediaSize psf2:psftype="Feature">
      <psk:ISOA4 psf2:psftype="Option" psf2:default="true">
         <psk:MediaSizeWidth xsi:type="xsd:integer" psf2:psftype="ScoredProperty">210000</psk:MediaSizeWidth>
         <psk:MediaSizeHeight xsi:type="xsd:integer" psf2:psftype="ScoredProperty">297000</psk:MediaSizeHeight>
         <psk12:PortraitImageableSize...>3400,5000,203200,287000</psk12:PortraitImageableSize>
      </psk:ISOA4>
      <psk:NorthAmericaLetter psf2:psftype="Option" psf2:default="false">
         <psk:MediaSizeWidth xsi:type="xsd:integer" psf2:psftype="ScoredProperty">215900</psk:MediaSizeWidth>
         <psk:MediaSizeHeight xsi:type="xsd:integer" psf2:psftype="ScoredProperty">279400</psk:MediaSizeHeight>
         <psk12:PortraitImageableSize ...>6400,5000,203200,269400</psk12:PortraitImageableSize>
      </psk:NorthAmericaLetter>
      <psk:ISOA5 psf2:psftype="Option" psf2:default="false">
         <psk:MediaSizeWidth xsi:type="xsd:integer" psf2:psftype="ScoredProperty">148000</psk:MediaSizeWidth>
         <psk:MediaSizeHeight xsi:type="xsd:integer" psf2:psftype="ScoredProperty">210000</psk:MediaSizeHeight>
         <psk12:PortraitImageableSize ...>3400,5000,141200,200000</psk12:PortraitImageableSize>
      </psk:ISOA5>
      <ns0002:oe7x10in psf2:psftype="Option" psf2:default="false">
         <psk:MediaSizeWidth psf2:psftype="ScoredProperty" xsi:type="xsd:integer">177800</psk:MediaSizeWidth>
         <psk:MediaSizeHeight psf2:psftype="ScoredProperty" xsi:type="xsd:integer">254000</psk:MediaSizeHeight>
         <psk12:PortraitImageableSize ...>3400,5000,171000,244000</psk12:PortraitImageableSize>
      </ns0002:oe7x10in>
      <ns0002:JapanYou6Envelope psf2:psftype="Option" psf2:default="false">
         <psk:MediaSizeWidth psf2:psftype="ScoredProperty" xsi:type="xsd:integer">98000</psk:MediaSizeWidth>
         <psk:MediaSizeHeight psf2:psftype="ScoredProperty" xsi:type="xsd:integer">190000</psk:MediaSizeHeight>
         <psk12:PortraitImageableSize ...>5600,8000,86800,169300</psk12:PortraitImageableSize>
      </ns0002:JapanYou6Envelope>
   </psk:PageMediaSize>
```

```
<psk:PageMediaType psf2:psftype="Feature">
    <psk:AutoSelect ... psf2:psftype="Option" psf2:default="true"/>
    <psk:Plain ... psf2:psftype="Option" psf2:default="false"/>
    <psk:Photographic ... psf2:psftype="Option" psf2:default="false"/>
    <psk:EnvelopePlain ... psf2:psftype="Option" psf2:default="false"/>
    <ns0002:PhotoPaperGlossy psf2:psftype="Option" psf2:default="false"/>
    <ns0002:MattePhotoPaper psf2:psftype="Option" psf2:default="false"/>
</psk:PageMediaType>

<psk:JobInputBin psf2:psftype="Feature">
    <psk:AutoSelect psf2:psftype="Option" psf2:default="true"/>
    <ns0000:Main psf2:psftype="Option" psf2:default="false"> ... </ns0000:Main>
    <ns0000:Rear psf2:psftype="Option" psf2:default="false"> ... </ns0000:Rear>
</psk:JobInputBin>

<psk:PageOutputColor psf2:psftype="Feature">
    <psk:Color psf2:psftype="Option" psf2:default="true"/>
    <psk:Monochrome psf2:psftype="Option" psf2:default="false"/>
</psk:PageOutputColor>
```

1502

```
<psf2:InvalidCombination>
    <psf2:InvalidCombinationEntry psf2:feature="psk:PageMediaType" psf2:option="psk:Photographic"/>
    <psf2:InvalidCombinationEntry psf2:feature="psk:JobInputBin" psf2:option="ns0000:Main"/>
</psf2:InvalidCombination>
<psf2:InvalidCombination>
    <psf2:InvalidCombinationEntry psf2:feature="psk:PageMediaType" psf2:option="ns0002:PhotoPaperGlossy"/>
    <psf2:InvalidCombinationEntry psf2:feature="psk:JobInputBin" psf2:option="ns0000:Main"/>
</psf2:InvalidCombination>
<psf2:InvalidCombination>
    <psf2:InvalidCombinationEntry psf2:feature="psk:PageMediaType" psf2:option="ns0002:PhotoPaperGlossy"/>
    <psf2:InvalidCombinationEntry psf2:feature="psk:JobInputBin" psf2:option="ns0000:Disc"/>
</psf2:InvalidCombination>
    ...
</PrintDeviceCapabilities>
```

*1601*          FIG.16

```
<?xml version="1.0" encoding="utf-8"?>
<PrintDeviceCapabilities...>

...
   <psk:PageMediaSize psf2:psftype="Feature">
       <psk:ISOA4 psf2:psftype="Option" psf2:default="true">
           <psk:MediaSizeWidth xsi:type="xsd:integer" psf2:psftype="ScoredProperty">210000</psk:MediaSizeWidth>
           <psk:MediaSizeHeight xsi:type="xsd:integer" psf2:psftype="ScoredProperty">297000</psk:MediaSizeHeight>
           <psk12:PortraitImageableSize...>3400,5000,203200,287000</psk12:PortraitImageableSize>
       </psk:ISOA4>
       <psk:NorthAmericaLetter psf2:psftype="Option" psf2:default="false">
           <psk:MediaSizeWidth xsi:type="xsd:integer" psf2:psftype="ScoredProperty">215900</psk:MediaSizeWidth>
           <psk:MediaSizeHeight xsi:type="xsd:integer" psf2:psftype="ScoredProperty">279400</psk:MediaSizeHeight>
           <psk12:PortraitImageableSize ...>6400,5000,203200,269400</psk12:PortraitImageableSize>
       </psk:NorthAmericaLetter>
       <psk:ISOA5 psf2:psftype="Option" psf2:default="false">
           <psk:MediaSizeWidth xsi:type="xsd:integer" psf2:psftype="ScoredProperty">148000</psk:MediaSizeWidth>
           <psk:MediaSizeHeight xsi:type="xsd:integer" psf2:psftype="ScoredProperty">210000</psk:MediaSizeHeight>
           <psk12:PortraitImageableSize ...>3400,5000,141200,200000</psk12:PortraitImageableSize>
       </psk:ISOA5>
   </psk:PageMediaSize>

<psk:PageMediaType psf2:psftype="Feature">
       <psk:AutoSelect...   psf2:psftype="Option" psf2:default="true"/>
   </psk:PageMediaType>

<psk:JobInputBin psf2:psftype="Feature">
       <psk:AutoSelect psf2:psftype="Option" psf2:default="false" ... />
       <ns0000:Tray1 psf2:psftype="Option" psf2:default="true" ... />
       <ns0000:Tray3 psf2:psftype="Option" psf2:default="false" .../>
       <ns0000:ByPassTray psf2:psftype="Option" psf2:default="false" ../>
       <ns0000:Tray2 psf2:psftype="Option" psf2:default="false" ../>
   </psk:JobInputBin>

<psk:PageOutputColor psf2:psftype="Feature">
       <psk:Color psf2:psftype="Option" psf2:default="true"/>
       <psk:Monochrome psf2:psftype="Option" psf2:default="false"/>
       <psk:GrayScale psf2:psftype="Option" psf2:default="false">
   </psk:PageOutputColor>

<psk:JobPageOrder psf2:psftype="Feature">
       <psk:Standard psf2:psftype="Option" psf2:default="true"/>
       <psk:Reverse psf2:psftype="Option" psf2:default="false"/>
   </psk:JobPageOrder>
                                                        1602
   <psf2:InvalidCombination>
       <psf2:InvalidCombinationEntry psf2:feature="psk:PageMediaSize" psf2:option="psk:ISOA5"/>
       <psf2:InvalidCombinationEntry psf2:feature="psk:JobInputBin" psf2:option="ns0000:BypassTray"/>
   </psf2:InvalidCombination>
   ...

</PrintDeviceCapabilities>
```

```
<?xml version="1.0" encoding="utf-8"?>
<PrintDeviceCapabilities...>

...
    <psk:PageMediaSize psf2:psftype="Feature">
        <psk:ISOA4 psf2:psftype="Option" psf2:default="true">
            <psk:MediaSizeWidth xsi:type="xsd:integer" psf2:psftype="ScoredProperty">210000</psk:MediaSizeWidth>
            <psk:MediaSizeHeight xsi:type="xsd:integer" psf2:psftype="ScoredProperty">297000</psk:MediaSizeHeight>
            <psk12:PortraitImageableSize...>3400,5000,203200,287000</psk12:PortraitImageableSize>
        </psk:ISOA4>
        <psk:NorthAmericaLetter psf2:psftype="Option" psf2:default="false">
            <psk:MediaSizeWidth xsi:type="xsd:integer" psf2:psftype="ScoredProperty">215900</psk:MediaSizeWidth>
            <psk:MediaSizeHeight xsi:type="xsd:integer" psf2:psftype="ScoredProperty">279400</psk:MediaSizeHeight>
            <psk12:PortraitImageableSize ...>6400,5000,203200,269400</psk12:PortraitImageableSize>
        </psk:NorthAmericaLetter>
        <psk:ISOA5 psf2:psftype="Option" psf2:default="false">
            <psk:MediaSizeWidth xsi:type="xsd:integer" psf2:psftype="ScoredProperty">148000</psk:MediaSizeWidth>
            <psk:MediaSizeHeight xsi:type="xsd:integer" psf2:psftype="ScoredProperty">210000</psk:MediaSizeHeight>
            <psk12:PortraitImageableSize ...>3400,5000,141200,200000</psk12:PortraitImageableSize>
        </psk:ISOA5>
    </psk:PageMediaSize>

<psk:PageMediaType psf2:psftype="Feature">
        <psk:AutoSelect ... psf2:psftype="Option" psf2:default="true"/>
    </psk:PageMediaType>

<psk:JobInputBin psf2:psftype="Feature">
        <psk:AutoSelect psf2:psftype="Option" psf2:default="false" ... />
        <ns0000:Tray1 psf2:psftype="Option" psf2:default="true" ... />
        <ns0000:Tray3 psf2:psftype="Option" psf2:default="false" .../>
        <ns0000:ByPassTray psf2:psftype="Option" psf2:default="false" ../>
        <ns0000:Tray2 psf2:psftype="Option" psf2:default="false" ../>
    </psk:JobInputBin>

<psk:PageOutputColor psf2:psftype="Feature">
        <psk:Color psf2:psftype="Option" psf2:default="true"/>
        <psk:Monochrome psf2:psftype="Option" psf2:default="false"/>
    </psk:PageOutputColor>

<psk:JobPageOrder psf2:psftype="Feature">
        <psk:Standard psf2:psftype="Option" psf2:default="true"/>
    </psk:JobPageOrder>

...

</PrintDeviceCapabilities>
```

INFORMATION PROCESSING APPARATUS CAPABLE OF DISPLAYING A PRINT SETTING SCREEN, CONTROL METHOD, AND STORAGE MEDIUM THEREFOR

BACKGROUND OF THE INVENTION

Field of the Invention

The present invention relates to an information processing apparatus, a control method, and a storage medium.

Description of the Related Art

A configuration for issuing a print instruction to a printing device connected to a host computer using a printer driver installed on the host computer as software for controlling the printing device is known. An operating system (OS) is installed as basic software on the host computer. The printer driver is configured based on specifications defined by the OS and is called from the OS and then operates. A vendor that provides a printing device provides a printer driver compatible with the specifications of the OS, thereby making it possible to provide a means for issuing a print instruction to the printing device using the OS.

Windows® has recently provided a standard class driver (hereinafter also referred to as a "standard driver") that can be commonly used in printing devices provided by a plurality of vendors. Such a standard driver is included in an OS package and can be easily used by connecting any printing device to a host computer. Accordingly, there is no need to install another model-specific printer driver suitable for the printing device, which enhances user's convenience. The standard driver is configured to designate print functions in accordance with PrintCapabilities generated based on information obtained from the connected printing device. This enables a user who uses the standard driver to designate print functions in accordance with the capabilities of the connected printing device, even when one standard driver is used.

An application for function extension (hereinafter also referred to as an "extension application") can be associated with the standard driver. The extension application can be provided by a vendor that provides the printing device. The extension application can provide a function (extension function) that cannot be implemented only by the standard driver by editing Print Device Capabilities (PDC) generated by the standard driver. Japanese Patent Application Laid-Open No. 2019-74906 discusses a technique for extending a function such as a stamp function by an extension application.

The extension application discussed in Japanese Patent Application Laid-Open No. 2019-74906 is configured to edit a spool file. The extension application can implement a layout printing function by editing the spool file. The extension application is called based on a user operation on a print setting screen displayed by an application or an OS installed on an information processing apparatus, and displays an extended print setting screen. In this case, there is a possibility that a print setting made through the print setting screen displayed by the application or the OS may include a combination of setting values that cannot be executed on one print job by a printing device. If printing is executed without changing such a print setting, the combination of setting values that cannot be set to one print job may be displayed on the extended print setting screen.

SUMMARY OF THE INVENTION

According to an aspect of the present invention, a control method for an information processing apparatus storing a print setting application for displaying a print setting screen, the print setting application being stored in association with a standard printer driver provided by the information processing apparatus, the control method being implemented by executing the print setting application, the control method includes obtaining a print setting made via another print setting screen provided by software different from the print setting application, determining whether the obtained print setting includes a combination of setting values matching conflict information, and performing control processing based on a result of the determination in a case where it is determined that the print setting includes the combination of setting values matching the conflict information.

Further features of the present invention will become apparent from the following description of embodiments with reference to the attached drawings.

BRIEF DESCRIPTION OF THE DRAWINGS

FIGS. 3A, 3B, and 3C each illustrate an example of a screen to be displayed by a print setting screen extension unit according to the embodiment of the present invention.

FIG. 6 is a flowchart illustrating conflict list generation processing according to the embodiment of the present invention.

FIG. 7 illustrates an example of "media-col-database" obtained from an inkjet printing device according to the embodiment of the present invention.

FIG. 8 illustrates an example of a conflict list for the inkjet printing device according to the embodiment of the present invention.

FIG. 14 illustrates an example of PDC generated by print data generation software when the type of the printing device is an inkjet printer according to the embodiment of the present invention.

FIGS. 15A and 15B illustrate an example of PDC generated by an extension application when the type of the printing device is an inkjet printer according to the embodiment of the present invention.

FIG. 16 illustrates an example of PDC generated by print data generation software when the type of the printing device is a laser beam printer according to the embodiment of the present invention.

FIG. 17 illustrates an example of PDC generated by the extension application when the type of the printing device is a laser beam printer according to the embodiment of the present invention.

DESCRIPTION OF THE EMBODIMENTS

Figure 1:
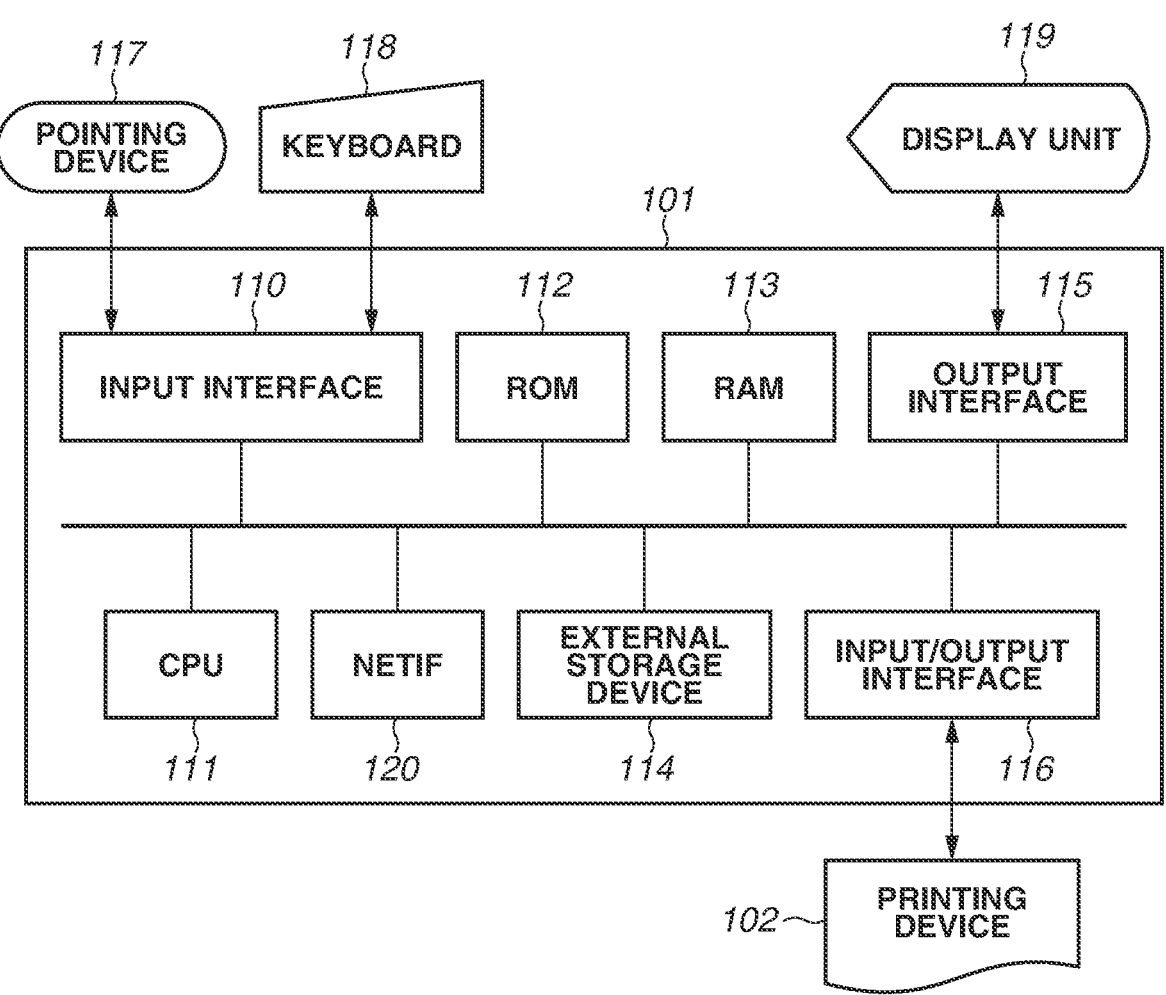
FIG. 1 is a block diagram illustrating a hardware configuration example of a printing system according to an embodiment of the present invention.

Embodiments of the present invention will be described in detail below with reference to the attached drawings. The following embodiments are not intended to limit the claimed invention and are illustrative of aspects of the present invention. Not all combinations of features described in the embodiments are essential to the solution to the present invention. The embodiment(s) or the features thereof described below can be implemented solely or as a combination of a plurality of the embodiments or features thereof where necessary or where the combination of elements or features from individual embodiments in a single embodiment is beneficial. The same components are denoted by the same reference numerals, and descriptions thereof are omitted.

<Hardware Configuration of Printing System>

FIG. 1 is a block diagram illustrating a hardware configuration of a printing system. An information processing apparatus 101 illustrated in FIG. 1 is an example of an information processing apparatus and includes an input interface 110, a central processing unit (CPU) 111, a read-only memory (ROM) 112, a random access memory (RAM) 113, an external storage device 114, an output interface 115, and an input/output interface 116. The input interface 110 is connected to input devices such as a keyboard 118 and a pointing device 117. The output interface 115 is connected to a display device such as a display unit 119. A net interface (NETIF) 120 performs control processing to transfer data to an external device via a network.

The ROM 112 stores an initialization program. The external storage device 114 stores a group of application programs, an operating system (OS), print data generation software, and other various pieces of data. The RAM 113 is used as a working memory or the like in the case of executing various programs stored in the external storage device 114, and various programs can be operated in the information processing apparatus 101.

In a first embodiment of the present invention, the CPU 111 performs processing according to procedures of programs stored in the ROM 112, thereby executing functions to be described below and processing in flowcharts to be described below in the information processing apparatus

101. A printing device 102, which is an example of a device, is connected to the information processing apparatus 101 via the input/output interface 116. In the present embodiment, the information processing apparatus 101 and the printing device 102 are separately provided, but instead may be configured as one information processing apparatus. An inkjet printer that prints an image by ejecting ink onto a sheet is described as an example of the printing device. However, printing may be executed by any other method (e.g., an electrophotographic method). The information processing apparatus 101 may be a desktop computer, a smartphone, or a laptop computer.

<Configuration of Printing System based on Software>

Figure 2A:
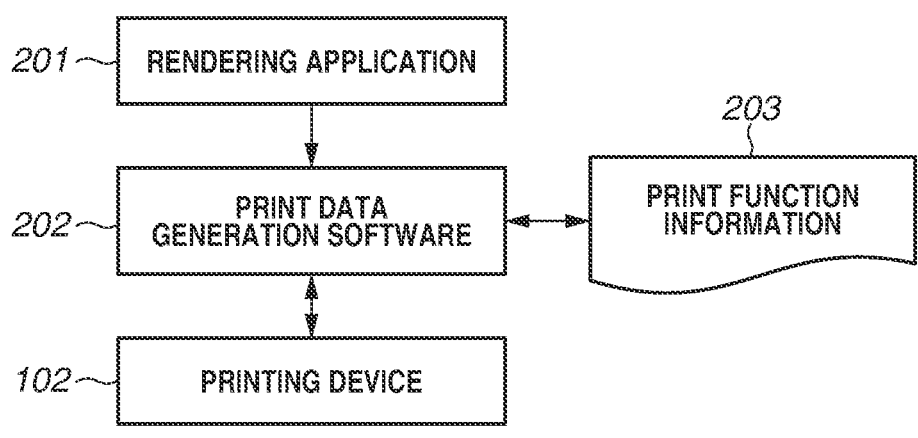
FIGS. 2A and 2B are block diagrams each illustrating a configuration example of the printing system according to the embodiment of the present invention.
Figure 2B:
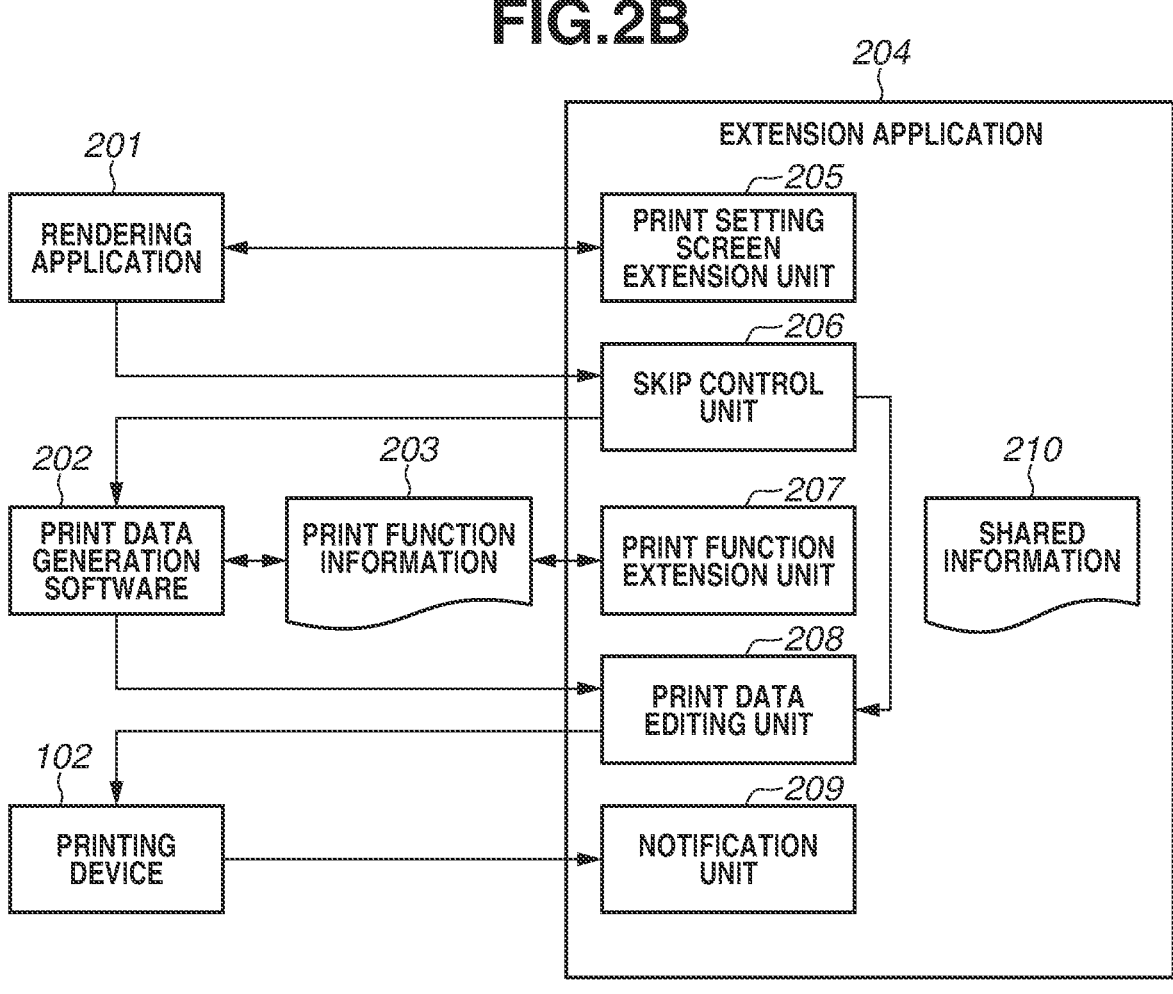

FIGS. 2A and 2B are block diagrams each schematically illustrating a configuration example of the printing system based on software. The printing system using the information processing apparatus 101 on which Microsoft® Windows® 11 is installed as an OS will now be described by way of example.

FIG. 2A illustrates a general configuration when an extension application 204 is not associated with a print data generation software 202 and the printing device 102.

A rendering application 201 is software for creating a content (rendering data) to be printed. For example, the rendering application 201 corresponds to a text creation application or a table calculation application. Upon receiving a print request from a user, the rendering application 201 provides a notification about a print instruction to the OS. The print instruction includes print setting information for instructing operations of the print data generation software 202 and the printing device 102. The print setting information is also referred to as PrintTicket (hereinafter abbreviated as "PT").

The rendering application 201 is configured to display a print setting screen provided by any one of the print data generation software 202, the OS, and the rendering application 201. The print setting screen includes a setting item (hereinafter also referred to as a "control item") indicating a print function that can be set in accordance with capability information (information that can be set as a print setting) obtained from the print data generation software 202, and a control item indicating a setting value corresponding to the setting item. The capability information is also referred to as PrintCapabilities (hereinafter abbreviated as "PC").

The print data generation software 202 determines the PC based on print function information 203. The print function information 203 is data indicating print functions that describe all settable print functions, setting values thereof, and an exclusive relationship among the setting values. The print function information 203 is also referred to as Print Device Capabilities (PDC). The PDC 203 is included in a configuration file of the print data generation software 202 and is located in the external storage device 114. The print data generation software 202 or the OS obtains attribute data on the printing device 102 from the printing device 102, and updates the PDC 203 in accordance with the attribute information in the obtained attribute data. The PDC 203 is editable using the print data generation software 202 or the OS, but cannot be directly edited by the rendering application 201 or the extension application 204 to be described below.

The attribute data on the printing device 102 is obtained as a response when a Get-Printer-Attributes operation of an Internet Print Protocol (IPP) is issued to the printing device 102. The response includes attribute information indicating functions (printing device capabilities) that can be designated by the printing device 102 and setting values associated with the attribute information. This response is stored in the RAM 113. The print data generation software 202 or the OS edits the PDC 203 based on the attribute information that indicates the capabilities of the printing device 102 and is obtained as a response. The PDC 203 is generated for each printing device 102. This configuration enables the print data generation software 202 to be configured such that the user can designate print functions that can be used in each printing device 102 depending on the connected printing device 102. In other words, even when printing devices having different functions or printing devices developed by different vendors are connected, the print data generation software 202 can be configured such that the user can designate available print functions depending on the connected printing device 102.

A configuration using an IPP Class Driver installed on Windows® 10 is used as the print data generation software 202 will now be described. The IPP Class Driver is a printer driver for executing print processing based on specifications of a standard print protocol called "IPP", and is included in an OS package. The IPP Class Driver is a printer driver that generates image data of a predetermined format, such as a portable document format (PDF) or Printer Working Group (PWG)-Raster, which is transmitted according to the IPP. The IPP Class Driver is not a unique printer driver for each model of the printing device 102, but is a standard class driver that can be commonly used in a plurality of printing devices developed by a plurality of vendors and functions as a standard printer driver. The IPP Class Driver obtains attribute information indicating the capabilities of the connected printing device 102 so that the user can designate print functions supported by the connected printing device 102, and generates the PDC 203 based on the information.

The OS generates intermediate data (also referred to as input data) based on the print instruction output from the rendering application 201, and delivers the intermediate data to the print data generation software 202. The data output for printing from the rendering application 201 is data of a graphic device interface format (GDI-format data) or data of an Extensible Markup Language (XML) Paper Specification format (XPS-format data). In the case of using the IPP Class Driver as the print data generation software 202, GDI-format data output from the rendering application 201 is converted into XPS-format data by the OS, and the XPS-format data is input to the print data generation software 202. If XPS-format data is output from the rendering application 201, the OS delivers the XPS-format data as intermediate data to the print data generation software 202. The intermediate data includes rendering data, which is information about a picture formed on a sheet, and information about print settings made by the user.

The print data generation software 202 converts the obtained intermediate data into print data that can be interpreted by the printing device 102, and transmits the print data to the printing device 102. In the present embodiment, the print data generation software 202 converts the input intermediate data into print data of PDF or PWG-Raster format, and transmits the print data to the printing device 102.

The print data includes rendering data, which is information about a picture formed on a sheet, and print setting attribute information (attribute information for designating print settings) generated based on the print setting information set by the user. The print setting attribute information includes attribute information indicating functions (printing device capabilities) that can be designated in the printing device 102, and setting values related to the attribute information.

The printing device 102 performs printing on a sheet based on the print data transmitted from the print data generation software 202. In this case, the printing device 102 forms rendering data included in the print data on a sheet in an operation based on the print setting attribute information included in the print data. The print setting attribute information includes attribute information for designating print qualities (image quality priority, speed priority, etc.), two-sided printing, and the like, and setting values for the attribute information. For example, if the print setting attribute information includes attribute information for designating two-sided printing, the printing device 102 executes two-sided printing.

FIG. 2B is a block diagram illustrating a configuration example when the extension application 204 is associated with the print data generation software 202 and the printing device 102. Components and processing that are not mentioned below are similar to those in the configuration illustrated in FIG. 2A.

The extension application 204 is software for extending the functions of the print data generation software 202 and is not included in the OS package. The use of the extension application 204 enables the user to set setting values for setting items that cannot be set only by the print data generation software 202, and to perform layout processing on rendering data. The print data generation software 202 may support only the general-purpose setting items, and may not support setting items such as stapleless printing, bookbinding printing, and particular types of sheets. Settings made via an extended print setting screen displayed by the extension application 204 can be written into the print setting information.

It may be desirable for the user to download the extension application 204 from a server via the Internet and to install the extension application 204 on the information processing apparatus 101. Alternatively, the extension application 204 may be automatically installed when the printing device 102 is connected to the information processing apparatus 101. Specifically, when the printing device 102 is connected to the information processing apparatus 101, the OS obtains device identification information from the printing device 102. The OS may download the extension application 204 corresponding to the obtained device identification information from the server via the Internet and may install the extension application 204. In other words, the print data generation software 202 and the extension application 204 are stored as separate files in the information processing apparatus 101. In the present embodiment, the print data generation software 202 is included in the OS package and is provided by the same vendor as that of the OS. The extension application 204 is an application provided by the vendor that provides the printing device 102, and is not applied to printing devices developed by other vendors.

The print data generation software 202 and the extension application 204 may be updated and upgraded in version. The update processing for the print data generation software 202 and the update processing for the extension application 204 are performed at different timings, respectively. In other words, the timing when the print data generation software 202 is obtained by the information processing apparatus 101 is different from the timing when the extension application 204 is obtained by the information processing apparatus 101.

A trigger for obtaining the print data generation software 202 by the information processing apparatus 101 is also different from a trigger for obtaining the extension application 204 by the information processing apparatus 101. When the extension application 204 is installed, the OS associates the extension application 204 with the print data generation software 202 and the printing device 102.

The extension application 204 described in the present embodiment includes a print setting screen extension unit 205, a skip control unit 206, a print function extension unit 207, a print data editing unit 208, and a notification unit 209. The extension application 204 also includes shared information 210 that is accessible from these units in common. The shared information 210 is a file stored in the external storage device 114, or information stored in the RAM 113. The extension application 204 is configured to write and read information to and from the shared information 210 using an application program interface (API) provided by the OS. The shared information 210 is allocated as an area where information inherent in the application can be stored, and can also store information other than the attribute data on the printing device 102. The shared information 210 is information different from the PDC 203 generated by the print data generation software 202 or the OS so that the user can designate print functions that can be used in the connected printing device 102.

The extension application 204 is activated every time a notification about a request for using each unit is provided from the OS. The operation of the extension application 204 is terminated every time the processing of each unit ends. In this case, the OS activates the extension application 204 every time the OS receives a request for using each unit. Alternatively, for example, the OS may terminate the operation of the extension application 204 when the processing of the print setting screen extension unit 205 ends. However, the OS may maintain the extension application 204 in the activated state even after the processing of the skip control unit 206 ends.

Further, the extension application 204 may cancel processing during the processing of each unit. If the processing is cancelled, the OS delete a job being processed on a print queue.

Upon receiving the print request from the user, the rendering application 201 issues a print instruction to the OS. Also, in this configuration, the rendering application 201 can cause the print setting screen to be displayed, like in the configuration illustrated in FIG. 2A. When the user presses a "properties setting" button displayed on the print setting screen provided by the rendering application 201, the extended print setting screen is displayed by the extension application 204.

In this configuration, the extended print setting screen provided by the extension application 204 is displayed. Specifically, the print setting screen provided by the print setting screen extension unit 205 included in the extension application 204 is displayed. Whether to display the print setting screen provided by the print setting screen extension unit 205 depends on user's operation. The print setting screen extension unit 205 will be described in detail below with reference to FIG. 4. Thus, the extension application 204 including the print setting screen extension unit 205 functions as a print setting application.

When the rendering application 201 receives the print request from the user and issues the print instruction to the OS, the OS activates the skip control unit 206. The skip control unit 206 controls whether to skip the processing of the print data generation software 202. The skip control unit

206 cannot obtain intermediate data and print setting information. After the skip control processing of the skip control unit 206, the OS generates intermediate data based on the print instruction output from the rendering application 201, and delivers the intermediate data to the print data generation software 202. In a case where the skip control processing is not performed by the skip control unit 206, the print data generation software 202 processes the intermediate data into print data that can be interpreted by the printing device 102, and delivers the print data to the print data editing unit 208. Thus, the intermediate data can be processed by the print data editing unit 208.

On the other hand, in the case of skipping the processing of the print data generation software 202, the intermediate data is delivered to the print data editing unit 208 without being processed by the print data generation software 202. Thus, the intermediate data can be processed by the print data editing unit 208. Examples of the case where it is preferable to skip the processing of the print data generation software 202 include a case where scaling processing is to be performed by the print data editing unit 208. The intermediate data can be stored in a vector format with less degradation in quality during scaling. Accordingly, in a configuration in which the print data generation software 202 outputs an image in a raster format, the processing of the print data generation software 202 is skipped and the print data editing unit 208 processes the intermediate data. The skip control unit 206 may always issue an instruction to skip the processing of the print data generation software 202. Alternatively, whether to issue the skip instruction may be changed based on a setting value set in the print setting information. For example, if the print setting information includes a setting value that requires processing to be performed by the print data editing unit 208, the skip processing may be enabled, and if the print setting information includes no setting value that requires processing to be performed by the print data editing unit 208, the skip processing may be disabled.

The print data editing unit 208 edits the intermediate data delivered from the print data generation software 202, or edits the print data processed by the print data generation software 202. As edit contents, for example, in layout printing, the print data editing unit 208 changes the layout of the intermediate data or print data based on the print setting information about layout printing received from the OS. Further, the print data editing unit 208 can display a user interface (UI) screen on the display unit 119, and can display the layout result of the intermediate data or print data as a preview screen. In a state where the UI screen is opened, the print data editing unit 208 does not transmit the print data to the printing device 102, and print data transmission processing is activated when the UI screen is closed.

After the print data editing unit 208 has edited the print data, the print data is delivered to the printing device 102 via the OS. The printing device 102 performs printing on a sheet based on the received print data. If the processing of the print data generation software 202 is skipped by the skip control unit 206, the print data editing unit 208 may convert the received intermediate data into print data that can be interpreted by the printing device 102. A function provided by the OS may be used to convert the intermediate data into print data.

The extension application 204 includes the print function extension unit 207. The print function extension unit 207 can edit the PDC 203 generated by the print data generation software 202 or the OS. The print function extension unit 207 writes information to be written into the PDC 203 into the PDC 203 using the API of the OS, thereby editing the PDC 203. Thus, the print function extension unit 207 adds the function provided by the extension application 204. Editing the PDC also makes it possible to, for example, add functions that are supported by the printing device 102 but are not supported by the print data generation software 202, and to add an exclusive relationship among setting values of print functions.

When the extension application 204 is first associated with the printing device 102 and the print data generation software 202, the OS activates the print function extension unit 207. Further, the OS may activate the print function extension unit 207 at any other timing, for example, at start-up of the OS. This configuration enables the print function extension unit 207 to detect an extended function and to add the extended function to the PDC 203 in a case where an option device (e.g., a finisher) is added to the printing device 102 in a subsequent process and a function related to printing is extended.

The extension application 204 also includes the notification unit 209. The notification unit 209 can display a notification for the user upon occurrence of an error in the printing device 102. For example, if a paper empty error occurs in the printing device 102, the print data generation software 202 detects the error and the OS causes the display unit 119 to display a message using a notification function called a toast notification, which is a function of the OS. When the user presses the toast notification, the notification unit 209 in the extension application 204 is called from the OS and a UI screen of the notification unit 209 is displayed. The UI screen of the notification unit 209 is configured to display, for example, a detailed message about a paper empty error and a paper loading method.

After the extension application 204 has transmitted the print data to the printing device 102, the extension application 204 cannot display a screen such as a guide screen associated with the print data during processing of each unit.

The configuration of the extension application 204 for implementing the present embodiment is not limited to the configuration including all the functions (units) described above. A configuration including only some of the functions, or a configuration including functions other than the above-described functions may also be used. The extension application 204 may be simply referred to as print software.

<Example of Screen to be Displayed by Print Setting Screen Extension Unit>

Next, the extended print setting screen to be displayed by the print setting screen extension unit 205 will be described with reference to FIGS. 3A to 3C. As described above, when the "properties setting" button is selected on the print setting screen displayed by the rendering application 201 or the OS, the OS calls the print function extension unit 207. The called print function extension unit 207 causes the extended print setting screen to be displayed. FIG. 18B illustrates an example of the print setting screen to be displayed by the rendering application 201 as described below. In addition to the example of FIG. 18B, screens on which settings for printers used for printing and print settings for the number of print copies and general-purpose setting items can be made may be displayed.

The PC is generated based on the PDC 203 edited by the print function extension unit 207. An extended print setting screen 301 illustrated in FIG. 3A is an example of the screen to be displayed by the print setting screen extension unit 205 based on the generated PC. If the user selects the "properties setting" button on the rendering application 201 to issue an instruction to display the extended print setting screen, the print setting screen extension unit 205 is called from the OS. The print setting screen extension unit 205 displays a screen on which the user can designate setting values for print functions that can be designated using the print data generation software 202 based on the PC that can be obtained from the OS.

A control item 302 is a control item for setting the type of sheets to be used for printing. For example, items such as "plain paper" and "photo sheet" can be set. A control item 303 is a control item for setting the size of sheets to be used for printing. For example, items such as "A4" and "letter" can be set. A list 310 illustrated in FIG. 3B indicates a display state when the control item 303 is expanded, and the user can select "sheet size" from the expanded list.

A control item 304 is a control item for setting a paper feed port for print sheets in the printing device 102. For example, items such as "main tray" and "rear tray" can be set.

A control item 305 is a control item for setting the orientation of printing, and "portrait" and "landscape" can be set. A control item 306 is a control item for switching "enable" and "disable" of two-sided printing. A control item 307 is a control item for setting a binding direction during two-sided printing. For example, items such as "long-edge binding" and "short-edge binding" can be set. A control item 309 indicates a cancel button to close the screen without reflecting the settings. A control item 308 indicates an OK button to close the screen after reflecting the settings.

If the OK button is selected, the print setting screen extension unit 205 instructs the OS to update the PT with setting values set via the extended print setting screen. The OS updates the PT based on the setting values received from the print setting screen extension unit. The rendering application 201 or the OS displays the print setting screen based on the updated PT. Processing for printing is started when the print instruction is issued via the print setting screen. When the cancel button is selected, the print setting screen extension unit 205 finishes the display without updating the PT.

<Extension of Conflict Information by Print Function Extension Unit>

In inkjet printers and laser beam printers, a conflict of setting values that cannot be set to one print job occurs. Conflict information is represented as a combination of an attribute (feature) and a setting value (option) for a plurality of conflicting setting values.

If printing is executed by selecting features and options among the conflicting setting values, a print error may occur, or the conflicting setting values may be changed, so that printing is executed with setting values different from the intended setting values. If the PT includes setting values matching the conflict information, the user may need to change the print setting and to input a print job again, which leads to an increase in waste of ink and toner.

In the IPP Class Driver, attribute information indicating functions that can be used in combination and a combination of setting values can be obtained from the printing device 102 by issuing the Get-Printer-Attributes operation of the IPP. An attribute that is a function to be obtained from the printing device 102 is hereinafter referred to as a feature, and a setting value that is an option belonging to each function is hereinafter referred to as an option. The obtained combination information makes it possible to determine whether print settings made on the print setting screen displayed by the rendering application 201 or the OS can be used.

However, the IPP Class Driver is assumed to be used only for general-purpose attribute information and setting values that can be used in any type of printer. Specifically, conflict control processing to be uniquely performed by the IPP Class Driver is only control processing to be performed between some features and options when marginless printing is applied.

On the other hand, the use of the extension application 204 makes it possible to set attribute information and setting values unique to each printer vendor. However, conventionally, the IPP Class Driver did not obtain available combination information about the attribute information and setting values, and thus it was impossible to determine whether the print setting includes setting values matching the conflict information.

In the present embodiment, the print function extension unit 207 in the extension application 204 obtains and stores the conflict information in the printing device 102, and performs conflict control processing at the time of activation of the print setting screen provided by the print setting screen extension unit 205. When the print setting screen extension unit 205 is activated in response to the print instruction from the rendering application 201, the print setting screen extension unit 205 displays the print setting screen on which the conflict is resolved, thereby avoiding a failure in printing.

The following description may be given assuming that the print function extension unit 207 or the print setting screen extension unit 205 in the extension application 204 executes each processing. However, in practice, the CPU 111 executes the corresponding program to thereby implement the corresponding function.

First, processing in which the print function extension unit 207 in the extension application 204 obtains a combination of features and options that causes a conflict from the printing device 102 and stores the combination in the shared information 210 of the extension application 204 will be described with reference to FIG. 4.

Figure 4:
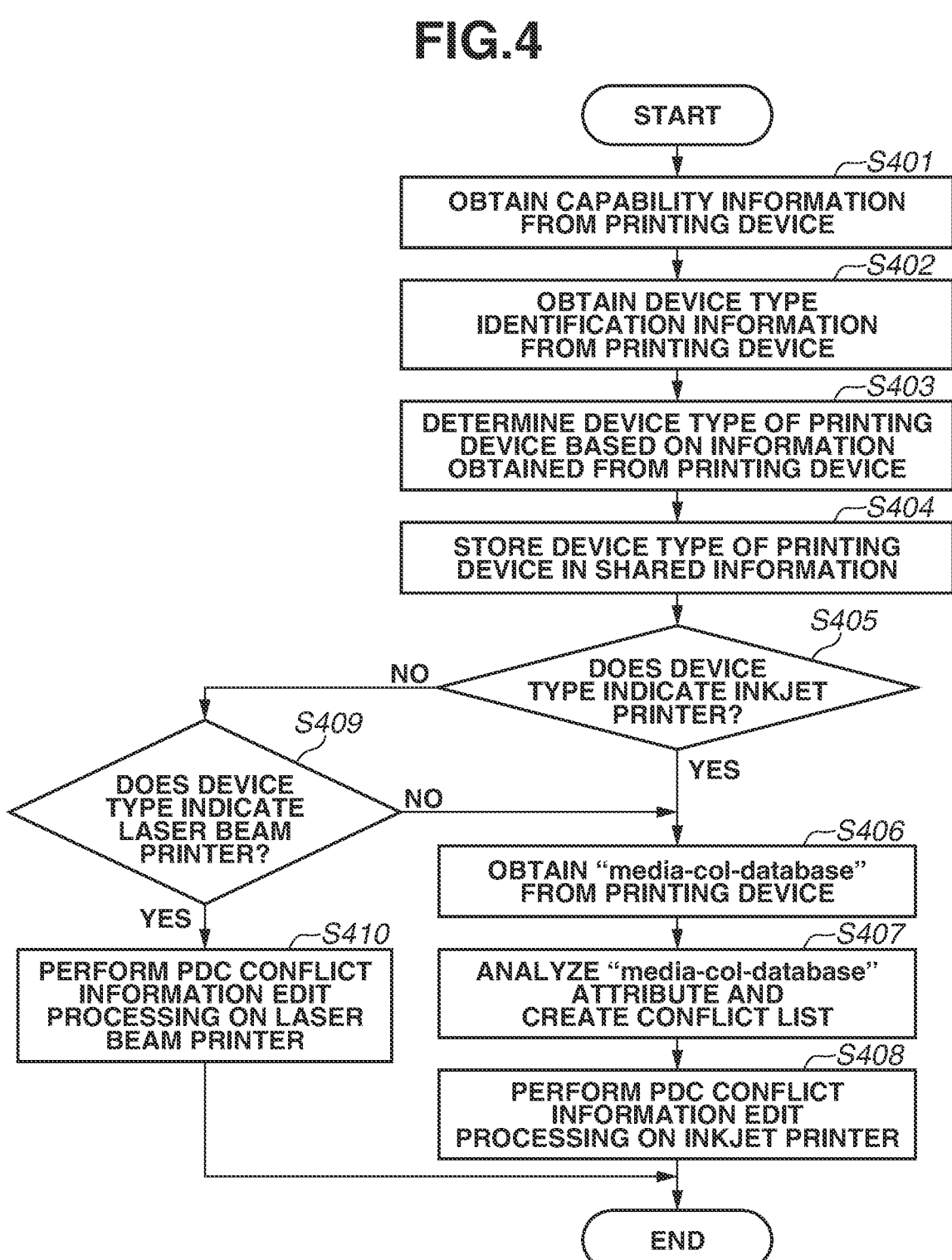
FIG. 4 is a flowchart illustrating processing of obtaining and editing conflict information according to the embodiment of the present invention.

A processing flow illustrated in FIG. 4 includes processing in which the print function extension unit 207 edits conflict information in the PDC 203 generated by the OS after storing the conflict information in the shared information 210. The processing of editing the conflict information in the PDC 203 will be described below.

The processing flow illustrated in FIG. 4 is started when the user selects a print queue associated with the extension application 204 after the OS is first associated with the extension application 204. The print queue is selected via an object for printer selection displayed by the rendering application 201 or the OS.

First, in step S401, the print function extension unit 207 in the extension application 204 obtains capability information from the printing device 102. The print function extension unit 207 obtains the capability information as a response from the printing device 102 by issuing the Get-Printer-Attributes operation of the IPP to the printing device 102. The print function extension unit 207 obtains the capability information about the printing device 102, and then the processing proceeds to step S402.

Next, in step S402, the print function extension unit 207 obtains device type identification information for determining the device type of the printing device 102 from the printing device 102, and then the processing proceeds to step S403.

In step S403, the print function extension unit 207 determines the device type of the printing device 102 based on the device type identification information obtained from the printing device 102. The device type indicates a device type determined based on the printing method of the printing device 102. In the present embodiment, the extension application 204 supports two device types, i.e., an inkjet method and an electrophotographic (laser beam) method.

Figure 5:
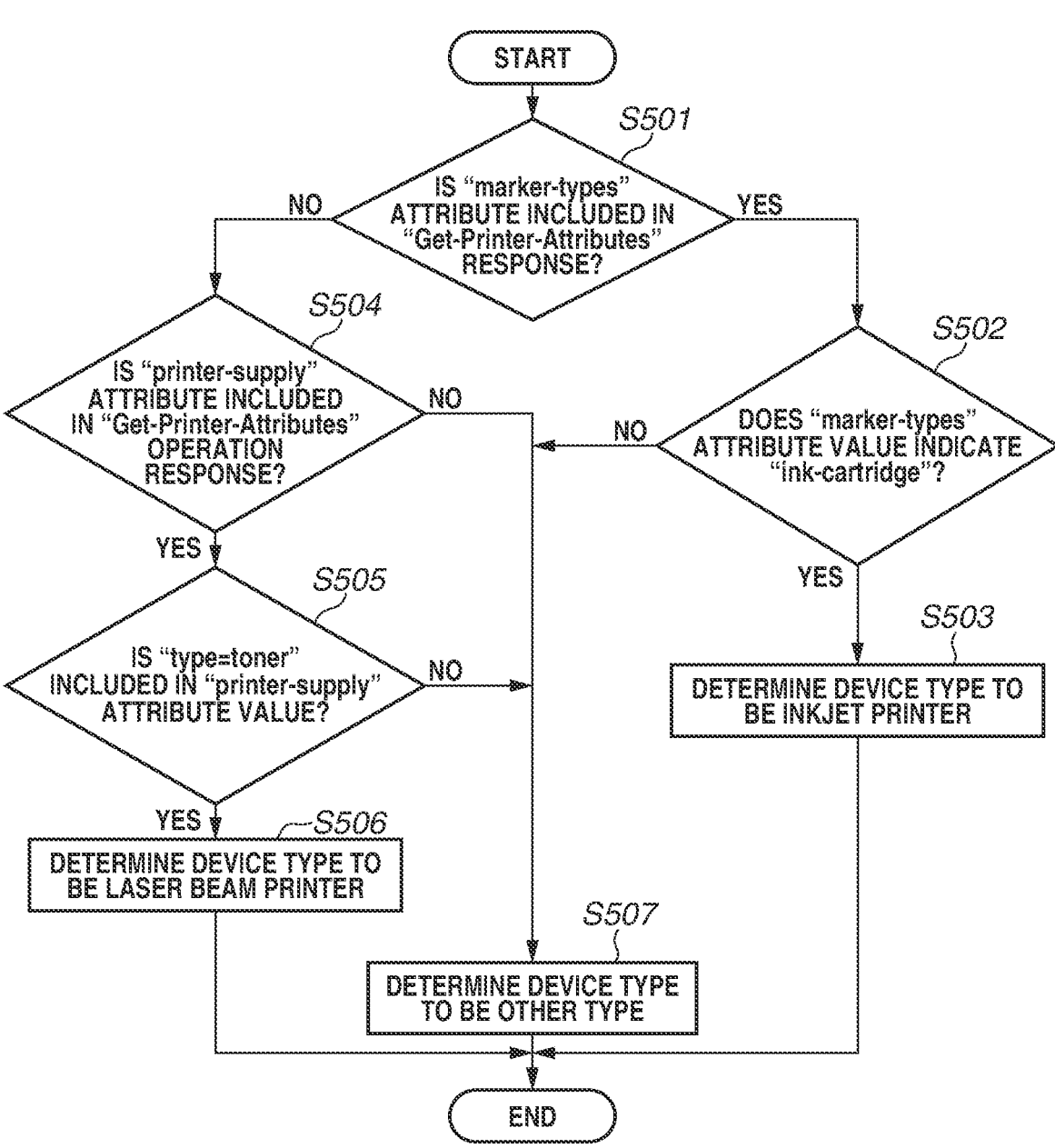
FIG. 5 is a flowchart illustrating model type determination processing according to the embodiment of the present invention.

A specific method of determining the device type using the device type identification information will be described with reference to FIG. 5. The processing illustrated in FIG. 5 is started when the print function extension unit 207 issues the Get-Printer-Attributes operation of the IPP and obtains a response from the printing device 102.

In step S501, the print function extension unit 207 determines whether the response to the Get-Printer-Attributes operation from the printing device 102 includes a "marker-types" attribute, and the processing proceeds to the subsequent processing.

If the print function extension unit 207 determines that the response includes the "marker-types" attribute (YES in step S501), the processing proceeds to step S502.

In step S502, it is determined whether the "marker-types" attribute value in the response to the Get-Printer-Attribute operation of the IPP from the printing device 102 indicates "ink-cartridge". If the print function extension unit 207 determines that the "marker-types" attribute value indicates "ink-cartridge" (YES in step S502), the processing proceeds to step S503. In step S503, the device type is determined to be an inkjet printer.

The printing device 102 according to the present embodiment is an example of a locally connected inkjet printer. Alternatively, the printing device 102 may be connected via a cloud service. In this case, a value indicating cloud connection may be added to a "printer-device-id" attribute value in the response to the Get-Printer-Attribute operation of the IPP.

In a case where the printing device 102 and the information processing apparatus 101 are connected via a cloud service, the print data generation software 202 for cloud connection is used in the information processing apparatus 101. The print function extension unit 207 may determine the name and type of the print data generation software 202, to thereby determine whether the printing device 102 is connected via a cloud service, or is connected without involving a cloud service. If the print function extension unit 207 determines that the printing device 102 and the information processing apparatus 101 are connected via a cloud service, the print function extension unit 207 issues a request for obtaining capability information or the like about the printing device 102 to the cloud service. In this case, the information processing apparatus 101 obtains information about the printing device 102 registered in the cloud service from the cloud service.

In step S501, if the print function extension unit 207 determines that the response does not include the "marker-types" attribute (NO in step S501), the processing proceeds to step S504.

In step S504, the print function extension unit 207 determines whether the response to the Get-Printer-Attribute operation of the IPP from the printing device 102 includes a "printer-supply" attribute. If the print function extension unit 207 determines that the response includes the "printer-supply" attribute (YES in step S504), the processing proceeds to step S505. In step S505, the print function extension unit 207 determines whether the "printer-supply" attribute value in the response to the Get-Printer-Attribute operation of the IPP from the printing device 102 includes "type=toner". If the print function extension unit 207 determines that the "printer-supply" attribute value includes "type=toner" (YES in step S505), the processing proceeds to step S506. In step S506, the print function extension unit 207 determines the device type of the printing device 102 to be a laser beam printer.

If the result of the determination by the print function extension unit 207 in steps S502, S504, and S505 indicates "NO", the processing proceeds to step S507. In step S507, the print function extension unit 207 determines the device type of the printing device 102 to be other type.

In the processing illustrated in FIG. 5, the print function extension unit 207 determines the device type based on information obtained by the response to the Get-Printer-Attribute operation of the IPP from the printing device 102, but instead may determine the device type based on any other information. For example, the determination may be made based on information obtained from the printing device 102 by any other method. More alternatively, the determination may be made based on information, such as the name of the printing device 102 that is obtained from the printing device 102, and table information included in the extension application 204. The table information may be obtained from the server (not illustrated).

The processing illustrated in FIG. 5 enables the extension application 204 to execute optimum conflict information processing depending on the connected printing device 102 and the device type of the connected printing device 102.

Referring again to the processing flow of FIG. 4, in step S404, the print function extension unit 207 stores the device type of the printing device 102 determined in step S403 in the shared information 210. In the present embodiment, the stored device type information about the printing device 102 is used for the print setting screen extension unit 205 to control the conflict when the provided print setting screen is displayed. The device type information may also be used by any other units in the extension application 204 for other uses. If the device type information about the printing device 102 is already included in the shared information 210, the print function extension unit 207 may be configured to skip the processing of steps S401 to S404 if the extension application 204 is activated the second and subsequent times. In step S404, the print function extension unit 207 stores the device type in the shared information 210, and then the processing proceeds to step S405.

In step S405, the print function extension unit 207 determines whether the device type of the printing device 102 stored in the shared information 210 indicates an inkjet printer. If the device type obtained by the print function extension unit 207 indicates an inkjet printer (YES in step S405), the processing proceeds to step S406.

In step S406, the print function extension unit 207 obtains a value corresponding to a "media-col-database" attribute.

Processing of generating conflict information unique to an inkjet printer will be described. In step S407, the print function extension unit 207 obtains the "media-col-database" attribute value in the response to the Get-Printer-Attribute operation of the IPP from the printing device 102 to obtain the conflict information. The "media-col-database" attribute value includes information about a list of combinations of printable option values in the printing device 102 in the list of combinations of option values that can be set as print settings in the printing device 102.

FIG. 7 is a table 701 that schematically illustrates an example of combination information included in the "media-col-database" attribute. Values in each column of the table 701 indicate option values belonging to each feature, and each row represents one combination. For example, a first row in the table 701 indicates that printing can be executed in the printing device 102 when a combination of "size: A4, paper feed port: automatic, and media: plain paper" is designated. The table 701 includes three features, i.e., "size", "paper feed port", and "media", but instead may include any other features.

Referring again to FIG. 4, in step S407, the print function extension unit 207 analyzes the "media-col-database" attribute value obtained in step S406, and creates a conflict list to be used by the print setting screen extension unit 205.

Conflict list creation processing will be described in detail with reference to FIG. 6.

In step S601, the print function extension unit 207 obtains a combination of printable option values in the printing device 102 from the "media-col-database" attribute value obtained as a response to the Get-Printer-Attribute operation from the printing device 102.

In step S602, the print function extension unit 207 generates combination information indication a combination of a feature and an option between two items based on the combination of option values in the "media-col-database" attribute obtained in step S601. For example, combination information on the first row of "media-col-database" 701 illustrated in FIG. 7 is generated. The print function extension unit 207 generates three pieces of combination information, i.e., "size: A4 and media: plain paper", "size: A4 and paper feed port: automatic", and "paper feed port: automatic and media: plain paper". In this case, for example, features of "size", "paper feed port", and "media" are used, and options of "A4", "automatic", and "plain paper" are used. However, any other combinations of features and options may be used. The print function extension unit 207 generates printable combination information between two items from the "media-col-database" attribute value, and the processing proceeds to step S603.

In step S603, the print function extension unit 207 obtains information indicating whether the printing device 102 supports a specific feature. In step S603, the print function extension unit 207 refers to the value preliminarily obtained from the response to the Get-Printer-Attribute operation of the IPP from the printing device 102. In the present embodiment, the print function extension unit 207 obtains information indicating whether the printing device 102 supports marginless printing, or supports two-sided printing. Marginless printing is a function of printing an image without margins at sheet edges.

Information that can be returned as the "media-col-database" attribute value by the printing device 102 is defined in the specifications of IPP printing. However, two-sided printing is a feature that is not included in this definition. Accordingly, the printing device 102 does not return any combination information including information about two-sided printing as the "media-col-database" attribute value according to the specifications. Also, regarding marginless printing, information to be returned by the printing device 102 includes only margin information as part of size information in the "media-col-database" attribute value, and thus the printing device 102 does not return any combination information including information about marginless printing. Therefore, in the present embodiment, features that are not returned by the printing device 102 are put together as a combination of printable features between two items based on information included in the extension application 204. The information that is not returned as the "media-col-database" attribute by the printing device 102 is not limited to the above-described features, but instead may be any other features or options.

In steps S604 to S606, processing of adding conflict information to the conflict list is performed. The print function extension unit 207 identifies conflict information based on the combination information between two items generated in step S602 for each feature appearing in "media-col-database", and adds the conflict information to the conflict list.

First, in step S604, the print function extension unit 207 determines whether the printing device 102 supports a specific feature. Specifically, the print function extension unit 207 changes the processing based on the information obtained in step S603 that indicates whether the printing device 102 supports marginless printing or two-sided printing. If the print function extension unit 207 determines that the printing device 102 supports marginless printing or two-sided print (YES in step S604), the processing proceeds to step S605. On the other hand, if the print function extension unit 207 determines that the printing device 102 supports neither marginless printing nor two-sided printing (NO in step S604), the processing proceeds to step S606.

In step S605, the print function extension unit 207 adds the features and options, which cannot be simultaneously set, as conflict information for each of marginless printing and two-sided print to the conflict list. If the printing device 102 supports only one of marginless printing and two-sided printing, the print function extension unit 207 adds information about options that cannot be used with the supported functions to the conflict list.

FIG. 8 illustrates an example of the conflict list created by the print function extension unit 207. An example of the conflict list is a list 801 that schematically illustrates information indicating combinations of two functions that cannot be set to one print job in the printing device 102. Function 1 and Function 2 in the list 801 are each composed of a combination of a feature name and an option name. Each row in the conflict list indicates conflict information. For example, the first row "Function 1: media, envelope, Function 2: marginless printing, ON" in the list 801 indicates that marginless printing cannot be effectively set if "envelope" is set as "media" used for printing.

The priority of Function 1 is higher than the priority of Function 2. The priority is a parameter to be referenced when the print function extension unit 207 changes a setting value to resolve a conflict. To resolve a conflict, Function 1 having higher priority is not changed, but Function 2 having lower priority is changed. For example, if the first row "Function 1: media, envelope, Function 2: marginless printing, ON" in the list 801 is selected, "Function 1: media, envelope" is held, and "ON" in "Function 2: marginless printing" is changed to "OFF".

Referring again to FIG. 6, in step S606, the print function extension unit 207 adds the combination that is not included in the combination information to the conflict list as conflict information based on the combination information between two items generated in step S602 for each feature. In step S606, the print function extension unit 207 identifies the combination of setting values corresponding to the conflict information for each feature described as the "media-col-database" attribute. The print function extension unit 207 adds the identified combination of setting values to the conflict list as the conflict information. A row 802 in the list 801 illustrated in FIG. 8 is an example of the conflict information added to the conflict list in step S606. The print function extension unit 207 determines that the combination information generated in step S602 does not include a combination "media: glossy gold, paper feed port: main tray", and adds this combination to the conflict list. This makes it possible to put together the conflict information based on information obtained using "media-col-database"

attribute and the conflict information about attribute information that cannot be obtained using the "media-col-database" attribution into one conflict list.

In steps S604 to S606, the print function extension unit 207 adds the conflict information indicating a combination of a feature and an option that cannot be simultaneously set to the conflict list for each feature. The above-described processing is performed on all features supported by the printing device 102, and the processing proceeds to step S607.

In step S607, the print function extension unit 207 adds conflict information common in all models of inkjet printers to the conflict list. For example, regarding a row 803 in the list 801 illustrated in FIG. 8, a combination of "Feature: marginless printing, Option: ON" indicates that two-sided print cannot be selected as a feature and two-sided (long-edge binding) cannot be selected as an option. In step S607, the print function extension unit 207 adds the conflict information common in all models to the conflict list, and the processing proceeds to step S608. In the printing device 102 of a predetermined type, the extension application 204 preliminarily stores the conflict information common in all models of printing devices.

The print function extension unit 207 adds the preliminarily stored conflict information to the conflict list. This configuration makes it possible to reduce the data amount of the conflict information obtained from the printing device 102 and to reduce the amount of processing associated with the conflict list creation processing.

In step S608, the print function extension unit 207 stores the conflict list created by putting together the conflict information in the processing up to step S607 in the shared information 210 of the extension application 204. If the extension application 204 is activated the second and subsequent times, the print function extension unit 207 may send an inquiry about the conflict list to the shared information 210 and may use the conflict information by loading the conflict information into the RAM 113.

The conflict processing to be performed when the device type of the printing device 102 indicates an inkjet printer has been described in detail above.

Referring again to FIG. 4, the print function extension unit 207 executes processing up to step S407, and then the processing proceeds to step S408. In step S408, conflict information edit processing is performed on the PDC 203 of the inkjet printer. The conflict information edit processing on the PDC 203 of the inkjet printer will be described below. In step S408, the PDC 203 is updated so that the updated PDC 203 can be used when the rendering application 201 or the OS of the information processing apparatus 101 determines whether the PT includes a combination of setting values matching conflict information.

If the print function extension unit 207 determines that the device type indicates a type other than an inkjet printer (NO in step S405), the processing proceeds to step S409.

In step S409, the print function extension unit 207 obtains the device type of the printing device 102 stored in the shared information 210. If the device type obtained by the print function extension unit 207 indicates a laser beam printer (YES in step S409), the processing proceeds to step S410. If the device type obtained by the print function extension unit 207 indicates a type other than a laser beam printer (NO in step S409), the print function extension unit 207 determines the device type to be other type, and the processing returns to step S406 described above.

If the device type obtained by the print function extension unit 207 in step S409 indicates a laser beam printer, the print function extension unit 207 skips the conflict list creation processing. If the device type indicates a laser beam printer, information about a list of combinations of option values that can be set as print settings in the printing device 102 is not returned as the "media-col-database" attribute value. Since the printing device 102 does not return the option values that can be set as print settings, the extension application 204 uses the conflict information preliminarily stored in the shared information 210 to execute conflict control processing.

In step S410, the print function extension unit 207 performs PDC conflict information edit processing for the laser beam printer. The PDC conflict information edit processing for the laser beam printer will be described below.

In the above-described embodiment, the processing of step S410 and step S406 is changed depending on whether the device type indicates a laser beam printer in step S409. The print function extension unit 207 may change the processing to be executed between the processing of step S410 and the processing of steps S406 to S408 depending on whether the "media-col-database" attribute value can be obtained from the printing device 102. In this case, if the "media-col-database" attribute value can be obtained from the printing device 102, the print function extension unit 207 executes the processing of steps S406 to S409. On the other hand, if the "media-col-database" attribute value cannot be obtained, the print function extension unit 207 executes the processing of step S410.

With this configuration, the conflict list can be created if information about the combination of setting values that can be used by the printing device 102 is returned to the information processing apparatus 101.

<Conflict Control upon Activation of Print Setting Screen by Print Setting Screen Extension Unit>

Next, conflict control processing to be performed by the print setting screen extension unit 205 at the time of activation of the print setting screen will be described with reference to FIG. 9.

Figure 9:
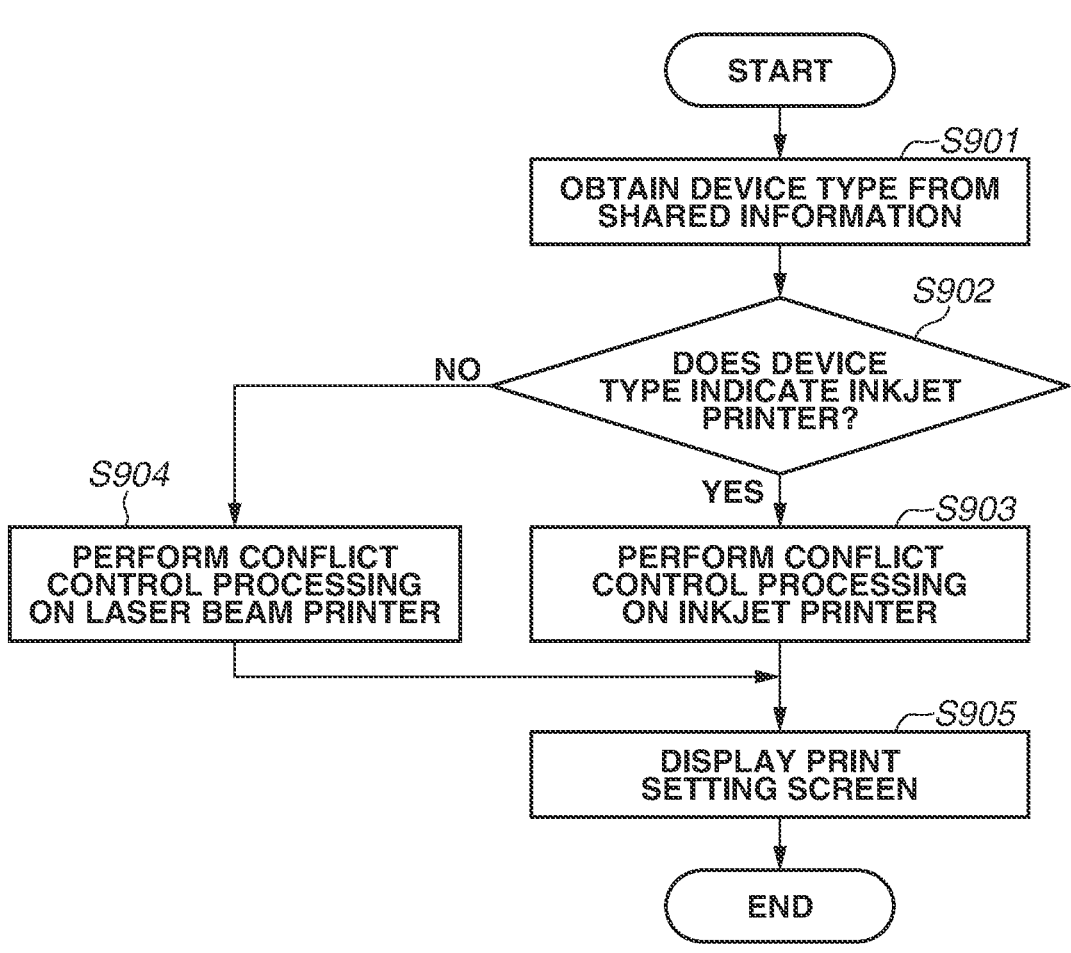
FIG. 9 is a flowchart illustrating conflict processing at the time of activation of a print setting screen according to the embodiment of the present invention.

First, a processing flow illustrated in FIG. 9 is started when the "properties setting" button is selected on the print setting screen displayed by the rendering application 201 or the OS and the print setting screen extension unit 205 is called from the OS. The print setting screen extension unit 205 may be called using any another object or instruction.

In step S901, the print setting screen extension unit 205 obtains the device type from the shared information 210, and then the processing proceeds to step S902.

In step S902, the print setting screen extension unit 205 determines whether the device type of the printing device 102 indicates an inkjet printer based on the device type obtained in step S901. If the print setting screen extension unit 205 determines the device type of the printing device 102 to be an inkjet printer (YES in step S902), the processing proceeds to step S903. If the print setting screen extension unit 205 determines that the device type of the printing device 102 indicates a type other than an inkjet printer (NO in step S902), the processing proceeds to step S904. If the print setting screen extension unit 205 determines the device type to be other type in step S507 illustrated in FIG. 5, the processing proceeds to step S903 from step S902.

In step S903, the print setting screen extension unit 205 performs the conflict control processing for the inkjet printer. The conflict control processing for the inkjet printer will be described with reference to a processing flow of FIG. 10.

Figure 10:
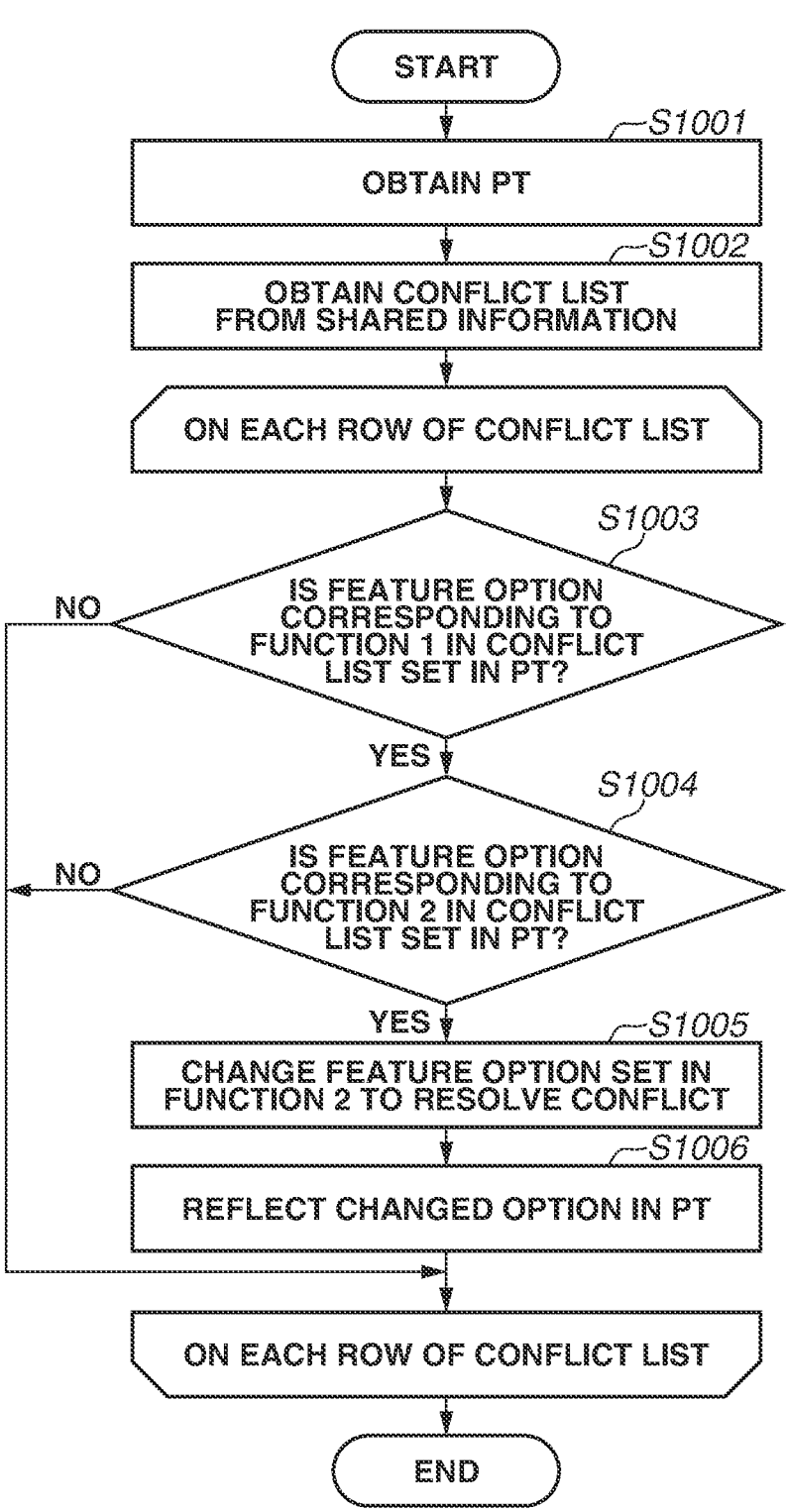
FIG. 10 is a flowchart illustrating conflict processing at the time of activation of the print setting screen when the type of a printing device is an inkjet printer according to the embodiment of the present invention.

In step S1001 illustrated in FIG. 10, the print setting screen extension unit 205 obtains a combination of a feature and an option set by the user on the rendering application 201 in the form of PT from the OS.

In step S1002, the print setting screen extension unit 205 obtains the conflict list created in the processing flow of FIG. 4 as described above from the shared information 210.

In steps S1003 to S1006, the print setting screen extension unit 205 repeatedly performs the following processing on each row of the obtained conflict list.

In step S1003, the print setting screen extension unit 205 determines whether a feature option corresponding to Function 1 is set in the obtained PT based on the PT and the conflict list. If the print setting screen extension unit 205 determines that the PT includes the feature option corresponding to Function 1 (YES in step S1003), the processing proceeds to step S1004. If the print setting screen extension unit 205 determines that the PT does not include the feature option corresponding to Function 1 (NO in step S1003), the print setting screen extension unit 205 terminates the processing on the corresponding row in the conflict list.

Next, in step S1004, the print setting screen extension unit 205 determines whether a feature option corresponding to Function 2 in the conflict list illustrated in FIG. 8 is set in the PT. If the feature option corresponding to Function 2 is included in the PT (YES in step S1004), the processing proceeds to step S1005. If the corresponding feature option is not included in the PT (NO in step S1004), the print setting screen extension unit 205 terminates the processing on the corresponding row in the conflict list. If the determination results in steps S1003 and S1004 indicate "YES", it is determined that the combination of setting values matching the conflict information is included in the PT. Accordingly, the processing of steps S1005 and S1006 is carried out and the setting value is changed to resolve the conflict.

In step S1005, the print setting screen extension unit 205 changes the feature option set in Function 2 to a value that does not conflict with the feature option set in Function 1. This resolves the conflict in the PT. If there are two options corresponding to Function 2, the print setting screen extension unit 205 changes one option to the other option in which no conflict occurs. If Function 2 includes a plurality of option values, the print setting screen extension unit 205 changes the options to default options.

The above-described processing is executed on all rows in the conflict list, thereby resolving the conflict in the PT.

An example of the conflict control processing executed by the print setting screen extension unit 205 in a case where the device type of the printing device 102 indicates an inkjet printer has been described above.

Referring again to FIG. 9, after the print setting screen extension unit 205 completes the inkjet conflict control processing in step S903, the processing proceeds to step S905.

In step S905, the print setting screen extension unit 205 obtains features and options to be displayed on the print setting screen, and displays the print setting screen based on the obtained values. This configuration makes it possible to display the extended print setting screen in a state where the conflict is resolved even when a combination of conflicting setting values is set on the print setting screen displayed by the rendering application 201 or the OS.

If the print setting screen extension unit 205 determines that the device type indicates a type other than an inkjet printer (NO in step S902) in the processing flow of FIG. 9, the processing proceeds to step S904. In step S904, the print setting screen extension unit 205 performs conflict control processing for the laser beam printer. The conflict control processing for the laser beam printer will be described with reference to FIG. 11.

Figure 11:
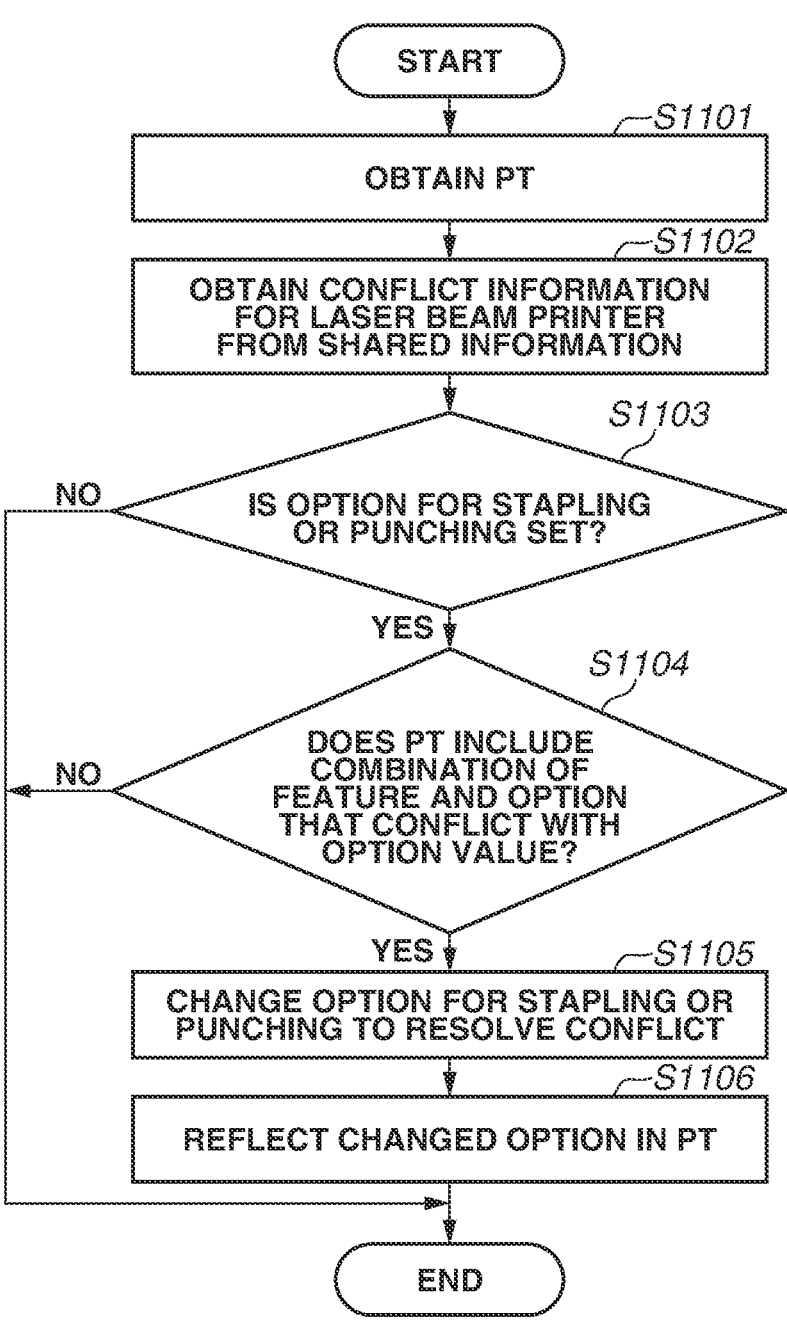
FIG. 11 is a flowchart illustrating conflict processing at the time of activation of the print setting screen when the type of the printing device is a laser beam printer according to the embodiment of the present invention.

In step S1101 illustrated in FIG. 11, the print setting screen extension unit 205 obtains a combination of a feature and an option set by the user on the rendering application 201 in the form of PT from the OS.

In step S1102, the print setting screen extension unit 205 obtains the conflict information for the laser beam printer preliminarily stored in the shared information 210. The conflict information for the laser beam printer includes, for example, a combination of setting values "sheet type: photo paper, stapling: enable". Assume that the extension application 204is distributed in a state where the conflict information for the laser beam printer is preliminarily set in the extension application 204.

In the present embodiment, the conflict information for the laser beam printer is downloaded to the information processing apparatus 101 together with the extension application 204. When the extension application 204 is installed, the conflict information is loaded into a memory as the shared information 210, so that the conflict information can be referenced. In the present embodiment, the conflict information for the laser beam printer as described above is downloaded as a part of the extension application 204. However, the conflict information may be placed on the server (not illustrated), and the extension application 204 may access the server to obtain the conflict information. In step S1102, the print setting screen extension unit 205 obtains the conflict information from the shared information 210, and the processing proceeds to step S1103.

In step S1103, the print setting screen extension unit 205 determines whether a predetermined feature and an option are selected in the PT obtained in step S1101. In the present embodiment, the print setting screen extension unit 205 determines whether stapling is selected as the predetermined feature, or punching is selected as an option. If the print setting screen extension unit 205 determines that stapling or punching as an option is set in the PT (YES in step S1103), the processing proceeds to step S1104. If neither stapling nor punching as an option is set in the PT (NO in step S1103), the print setting screen extension unit 205 terminates the processing flow of FIG. 11.

In step S1104, it is determined whether the PT includes a combination of a feature and an option that conflict with the option value selected for stapling or punching obtained in step S1103. The processing in step S1104 is performed based on the obtained conflict information.

If the print setting screen extension unit 205 determines that the PT includes a combination of a feature and an option that conflict with stapling or punching (YES in step S1104), the processing proceeds to step S1105. If the PT does not include the combination (NO in step S1104), the print setting screen extension unit 205 terminates the processing flow of FIG. 11.

In step S1105, the print setting screen extension unit 205 changes the option value selected for stapling or punching to a value that does not match the conflict information, and the processing proceeds to step S1106.

In step S1106, the print setting screen extension unit 205 reflects the changed option value for stapling or punching in the PT.

An example of the conflict control processing executed by the print setting screen extension unit 205 for the laser beam printer has been described above. The present embodiment assumes that the conflict control processing is performed when stapling is set as a feature and punching is set as an option. The print setting screen extension unit 205 may sequentially check whether a conflict occurs in the features and feature options included in the connected printing device 102. If a conflict occurs, the print setting screen extension unit 205 may resolve the conflict based on the priority of each feature.

Referring again to FIG. 9, in step S905, the print setting screen extension unit 205 obtains features and options to be displayed on the print setting screen based on the PT in which the conflict is resolved, and displays the print setting screen based on the obtained values.

With the above-described configuration, the print setting screen extension unit 205 performs the conflict control processing during display of the provided print setting screen, thereby making it possible to display the print setting screen in a state where the conflict is resolved in advance. This configuration avoids a situation where printing fails or a situation where the user ends up obtaining an unintended print result, for example, when options are changed by the printing device 102 to resolve the conflict. Consequently, the user's convenience in printing can be improved and an increase in waste of ink and toner can be prevented.

In the present embodiment, the print function extension unit 207 determines the device type and changes the conflict list creation processing to be executed depending on the device type. This enables execution of the conflict processing depending on the device type of the printing device 102 connected to the information processing apparatus 101. Further, the print setting screen extension unit 205 changes the conflict control processing to be executed depending on the device type, thereby making it possible to resolve the conflict by an appropriate method depending on the types of devices that return different pieces of information. In other words, in the present embodiment, a single extension application 204 provides optimum print function extension and print setting screen for the connected printing device 102.

In the present embodiment, the processing illustrated in FIG. 9 is executed at the timing when the print setting screen extension unit 205 starts to display the extended print setting screen. Alternatively, the processing illustrated in FIG. 9 may be executed at any timing other than the above-described timing. For example, the processing illustrated in FIG. 9 may be executed every time the user changes a setting value on the extended print setting screen. In this case, the processing illustrated in FIG. 9 is executed on the changed setting value after the change of the setting value is received from the user. When the extended print setting screen is opened, the setting value set on the extended print setting screen is not immediately written into the PT and is stored in a memory area that can be referenced by the extension application 204. In step S1001 illustrated in FIG. 10, or in step S1101 illustrated in FIG. 11, the print setting screen extension unit 205 obtains the changed setting value from the memory area instead of the PT. The subsequent processing is similar to that in FIGS. 10 and 11. If the changed setting includes a combination of conflicting setting values, the setting value corresponding to the setting item with lower priority is changed to resolve the conflict. In this case, the setting item corresponding to the changed setting value may be displayed on the extended print setting screen so that the user can recognize the changed setting value.

FIG. 3C illustrates a screen to be displayed in a case where the printing device 102 is an inkjet printer and the user makes a setting "sheet type: photo paper, two-sided printing: enable (long-edge binding)" on the extended print setting screen. The setting of two-sided printing is changed from "enable" to "disable", and a message "the setting value has been changed" is displayed. This makes it possible to inform the user of the change of the setting values. The message may be displayed, for example, when the print setting screen extension unit 205 starts to display the extended print setting screen, or when the conflict is resolved, or the message may not be displayed.

An operation to be performed when the print instruction is issued on the print setting screen provided by the rendering application 201 or the OS will be described below.

When the print instruction is issued on the print setting screen provided by the rendering application 201 or the OS, the rendering application 201 generates rendering data and inputs the rendering data and a print setting to the print data generation software 202. The print data generation software 202 determines whether the print setting received from the rendering application 201 includes a combination of conflicting setting values. This determination is made by comparing the conflict information described in the PDC 203 to be described below with the print setting received from the rendering application 201. If the print setting received from the rendering application 201 includes a combination of conflicting setting values, at least one of the setting values included in the combination is changed to resolve the conflict.

The print data generation software 202 generates page description language (PDL) data based on the rendering data.

In the present embodiment, the print data generation software 202 generates PDF data or raster image data of a predetermined format.

The generated PDL data and the print setting are transmitted to the printing device 102 via the print data editing unit 208.

In the embodiment described above, the print data generation software 202 generates PDL data and determines whether the print setting includes setting values matching the conflict information. Alternatively, the print data editing unit 208 may generate PDL data and may determine whether the print setting includes setting values matching the conflict information. In this case, upon receiving the print instruction, the rendering application 201 inputs a notification to the skip control unit 206. The skip control unit 206 instructs the print data generation software 202 to skip PDL data generation processing.

The print data generation software 202 transmits the received rendering data and the print setting to the print data editing unit 208 without converting the rendering data and the print setting. The print data editing unit 208 generates PDF data or raster image data of a predetermined format based on the received rendering data and print setting. In this case, the print data editing unit 208 determines whether the print setting received from the print data generation software 202 includes a combination of setting values matching the conflict information with reference to the conflict list stored in the shared information 210. If the print setting includes a combination of setting values matching the conflict information, the setting value corresponding to the function with lower priority designated in the conflict information is changed to resolve the conflict. The PDL data and the print setting are transmitted to the printing device 102.

<Conflict Processing at PDC Level in Print Function Extension Unit>

Next, the conflict edit processing to be performed on the PDC 203 by the print function extension unit 207 will be described. The components that are not mentioned in the present embodiment are similar to those in the first embodiment, and descriptions thereof are omitted.

As described above in the first embodiment, there is a plurality of combinations of a feature and an option value between two items that cannot be simultaneously set in the printing device 102. However, the conflict information described in the PDC 203 of the printing device 102 that is generated by the print data generation software 202 is limited. If a combination of option values that cannot be originally set is designated and printing is executed on the printing device 102, the printing device 102 may cause an unexpected operation. For this reason, a combination of option values that cannot be originally set is set as conflict information in the PDC 203 of the printing device 102.

This configuration will be described with reference to FIG. 14. FIG. 14 illustrates PDC 1401 generated by the print data generation software 202. The print data generation software 202 obtains configuration information from the printing device 102. In this case, an inquiry about a combination of conflicting setting values may be sent to the printing device 102. The print data generation software 202 obtains configuration information including the combination of conflicting setting values from the printing device 102, and updates the PDC 1401 based on the obtained configuration information. FIG. 14 illustrates the updated PDC 1401.

Features, options, and the like that can be used in the printing device 102 are described in the PDC 1401. The PDC 1401 includes information 1402 as conflict information for causing the OS to prohibit a printing setting in which two items described in the information are simultaneously designated. The example of the PDC 1401 indicates that the printing setting in which "media: photographic (photo paper), and paper feed port: main (main tray)" are designated is prohibited by the OS. The information described in the PDC 1401 is merely an example. In practice, other conflict information may be described.

By writing conflict information into the PDC 1401, the OS performs conflict control processing according to the PDC. Accordingly, the OS is expected to resolve the conflict and generate the PT before the print setting screen extension unit 205 is activated.

Next, a processing flow in which the extension application 204 edits PDC conflict information for the inkjet printer will be described with reference to FIG. 12. In the edit processing flow of FIG. 12, the print function extension unit 207 first determines the device type in steps S405 and S406 in the overall configuration of the PDC conflict information edit processing flow illustrated in FIG. 4. After the conflict control processing is executed depending on the device type, the execution of PDC conflict edit processing is started in step S408 or step S410.

The PDC conflict edit processing for an inkjet printer is different from that for a laser beam printer depending on the background as described below. The PDC edit processing for the inkjet printer will now be described.

Figure 12:
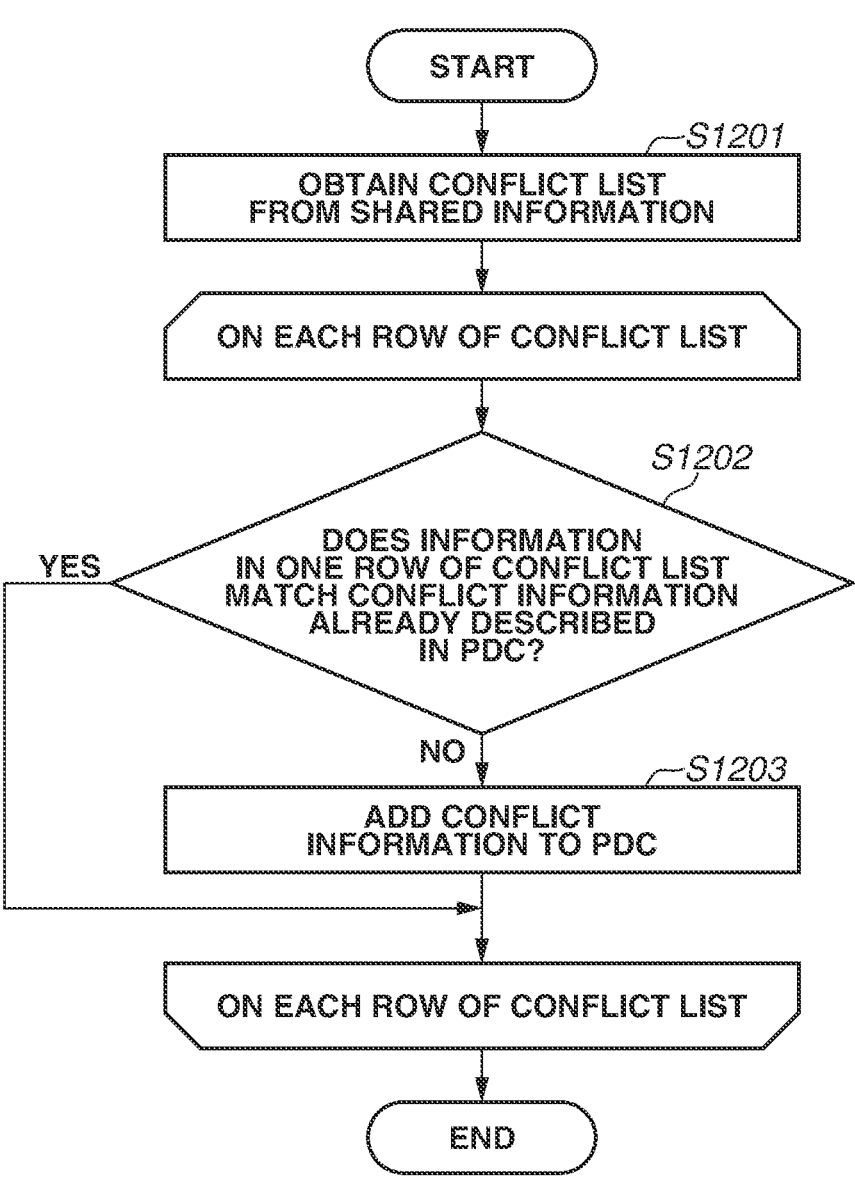
FIG. 12 is a flowchart illustrating Print Device Capabilities (PDC) conflict information edit processing when the type of the printing device is an inkjet printer according to the embodiment of the present invention.

In step S1201 in the processing flow of FIG. 12, the print function extension unit 207 obtains the conflict list from the shared information 210, and the processing proceeds to step S1202.

In steps S1202 to S1203, the print function extension unit 207 executes the processing on each row in the obtained conflict list.

In step S1202, the print function extension unit 207 determines whether information on one row of the obtained conflict list matches conflict information already described in the PDC 1401 illustrated in FIG. 14. If the print function extension unit 207 determines that the information matches the conflict information (YES in step S1202), the processing proceeds to step S1203. If the print function extension unit 207 determines that the information does not match the conflict information (NO in step S1202), the print function extension unit 207 determines that there is no need to add the information on the row of the conflict list as conflict information to the PDC 1401, and terminates the processing illustrated in FIG. 12.

In step S1203, the print function extension unit 207 edits the PDC 1401 obtained from the OS. The print function extension unit 207 adds conflict information in the conflict list created based on the "media-col-database" attribute obtained from the printing device 102, or model common rules to the PDC 1401.

The print function extension unit 207 repeatedly executes the processing of steps S1202 to S1203 on each row of the obtained conflict list. This makes it possible to add the conflict information included in the extension application 204 to the PDC 1401 and to use the conflict information for the OS to perform conflict control processing.

Figure 13:
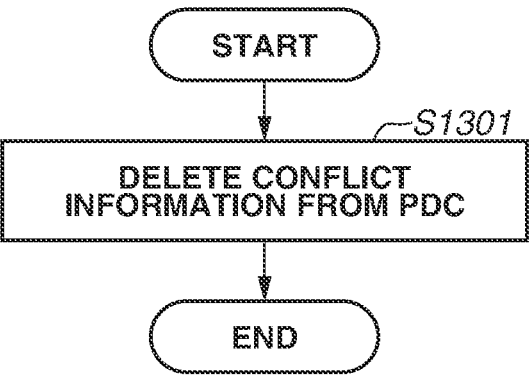
FIG. 13 is a flowchart illustrating PDC conflict information edit processing when the type of the printing device is a laser beam printer according to the embodiment of the present invention.

FIG. 15 illustrates PDC 1501 as an example of the PDC obtained after the print function extension unit 207 executes the processing illustrated in FIG. 13 on the PDC 1401. It can be seen that additional conflict information 1502 is added to the PDC 1501 compared to the PDC 1401.

The above-described processing makes it possible to add conflict information included in the extension application 204 to the PDC generated by the print data generation software 202 when the device type indicates an inkjet printer.

Next, if the device type indicates a laser beam printer, a combination of three or more feature options is preliminarily determined. In other words, conflict information includes a combination of three or more feature options. Accordingly, the number of pieces of conflict information in the laser beam printer is larger than that in the inkjet printer.

FIG. 16 illustrates PDC 1601 as an example of the PDC generated by the print data generation software 202 when the device type indicates a laser beam printer. Since the number of pieces of conflict information in the laser beam printer is larger than that in the inkjet printer, it takes a longer time for processing.

FIG. 13 is a flowchart illustrating a detailed processing flow of PDC edit processing to be performed by the print function extension unit 207 when the device type indicates a laser beam printer.

In step S1301, the print function extension unit 207 deletes conflict information 1602 described in the PDC 1601 of the printing device 102 obtained from the OS.

FIG. 17 illustrates edited PDC 1701 obtained after the print function extension unit 207 has deleted the conflict information 1602.

The PDC conflict edit processing for the laser beam printer in step S410 illustrated in FIG. 4 has been described in detail above.

The extension application 204 changes the PDC conflict edit processing to be executed based on the device type determined in FIG. 5 as described above. If the device type indicates an inkjet printer, the extension application 204 adds conflict information to the PDC 203 in the processing of FIG. 12. On the other hand, if the device type indicates a laser beam printer, the extension application 204 deletes the conflict information from the PDC 203 in the processing of FIG. 13. This processing enables the extension application 204 to implement optimum function extension processing depending on the connected printing device 102 and the device type of the connected printing device 102. Further, if the printing device 102 is an inkjet printer, the conflict control processing to be performed by the OS can be extended by adding conflict information based on information obtained from the printing device 102 to the PDC 203.

In the present embodiment, the processing to be executed is changed using two device types, i.e., an inkjet printer and a laser beam printer. Alternatively, three or more device types may be determined and the processing to be executed may be changed depending on the determined device type. The above-described configuration enables the extension application 204 according to the present embodiment to implement the function extension processing optimum for the connected printing device 102 using a single extension application 204.

<Example of Conflict Control by PDC>

The OS performs conflict control processing based on conflict information between two items described in PDC by editing the PDC as described above. Accordingly, the conflict can be resolved by referring to the PDC 203 even in a case where the print setting made when the rendering application 201 receives a print request from the user includes a combination of two conflicting setting values. Specifically, the OS determines whether the combination of conflicting setting values is set with reference to the features and option values described in the PT and the conflict information described in the PDC 203. This configuration makes it possible to deliver to the extension application 204 the PT in which the conflict is resolved.

By editing the PDC 203 as described above, the rendering application 201 can make a setting for preventing a combination of conflicting values from being simultaneously selected with reference to the PC generated based on the PDC 203.

Examples of screens to be displayed by the rendering application 201 will be described with reference to FIGS. 18A to 18C. A screen 1801 illustrated in FIG. 18 is an example of a standard photoviewer provided by Microsoft® Windows® in the present embodiment.

Figure 18A:
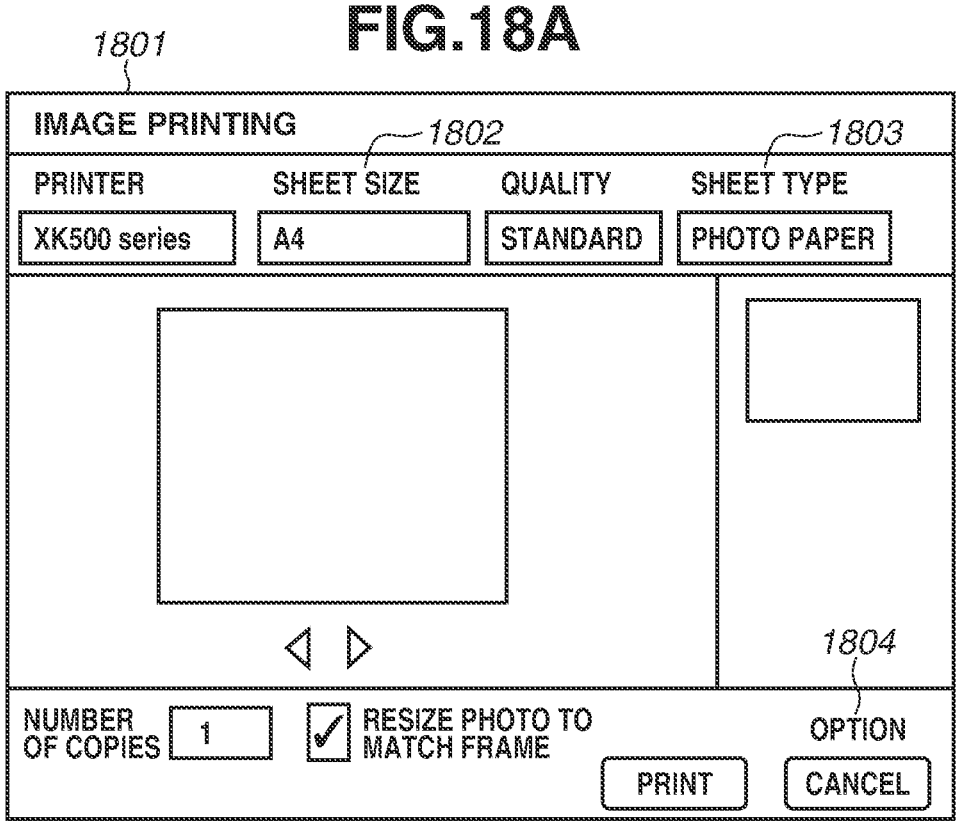
FIGS. 18A, 18B, and 18C each illustrate an example of a screen to be displayed by a rendering application according to the embodiment of the present invention.
Figure 18B:
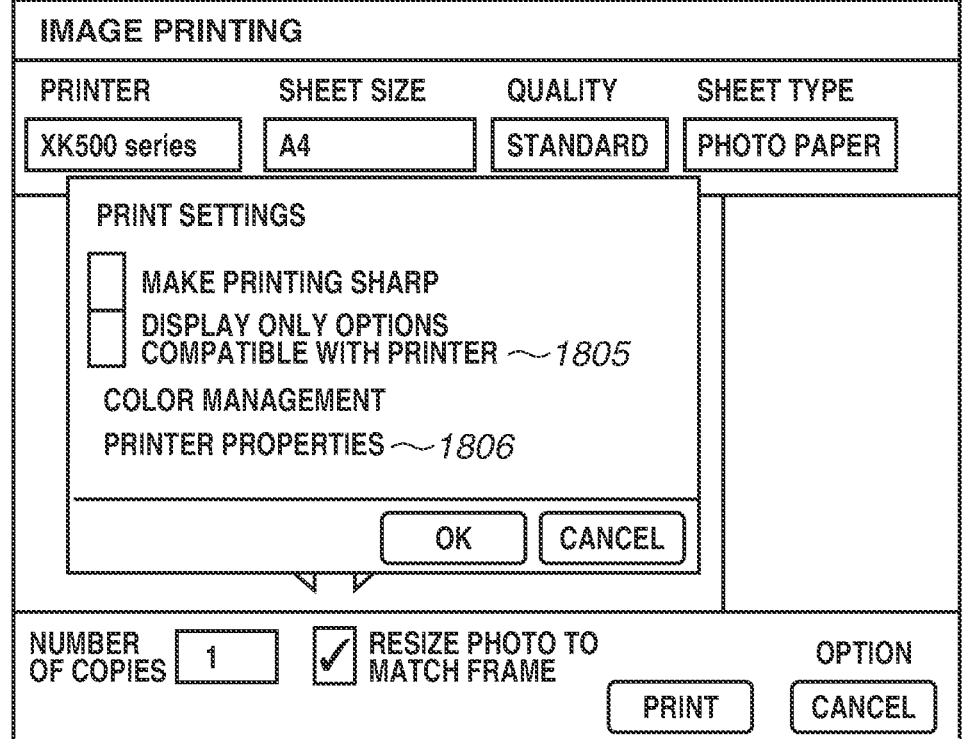

A control item 1802 illustrated in FIG. 18A is a control item for selecting a sheet size, and "sheet size: A4" is selected. A control item 1803 is for selecting a sheet type, and "sheet type: photo paper" is selected. FIG. 18A illustrates an example of a case where no conflict occurs. If a control item 1804 illustrated in FIG. 18 is selected, as illustrated in FIG. 18B, a dialog 1805 for print setting is displayed. If a control item 1806 located on the dialog 1805 is selected by the user, the extension application 204 is called from the OS and the extended print setting screen provided by the print setting screen extension unit 205 included in the extension application 204 is displayed.

Figure 18C:
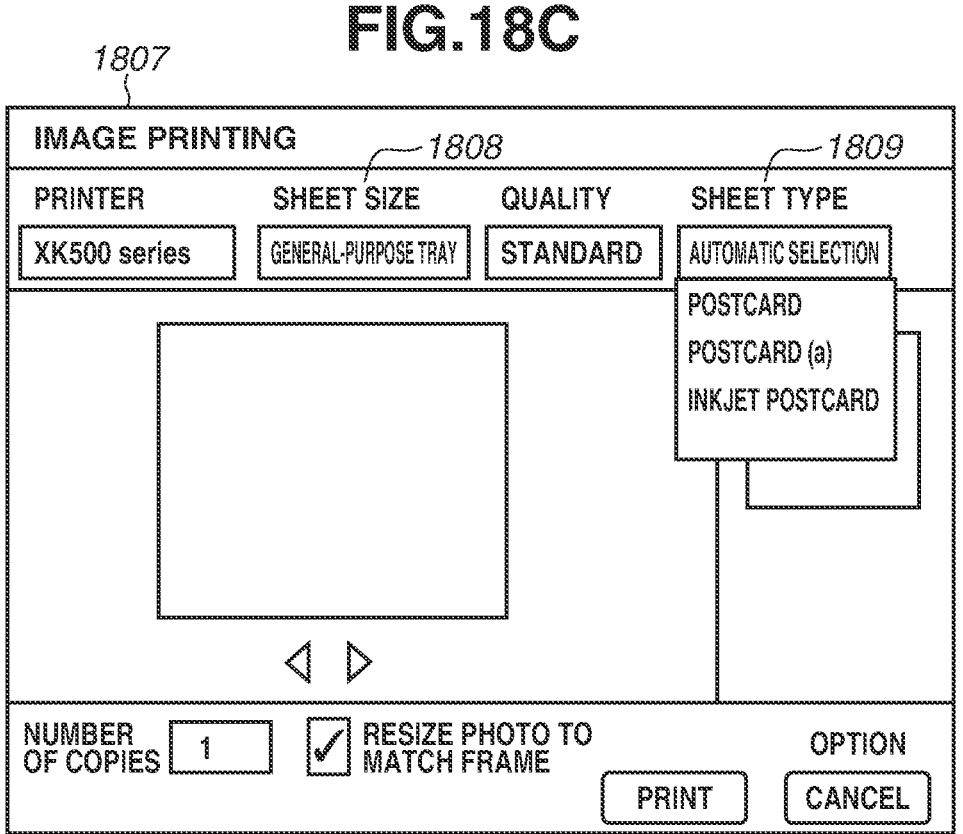

On the other hand, a screen 1807 illustrated in FIG. 18C is an example of a screen to be displayed when a conflict occurs. In a control item 1808 on the screen 1807, "sheet size: general-purpose tray" is selected. In this case, a control item 1809 on the screen 1807 indicates a display state when the control item 1809 is expanded. The user can select a sheet type from the list that has been expanded. In the control item 1809 on the screen 1807, "general-purpose tray" is selected as "sheet size", sheet types with which the option "sheet size: general-purpose tray" may conflict are not displayed as options on the control item that has been expanded. This configuration prevents the user from unintentionally selecting a combination of conflicting values when the print request is issued by the rendering application 201. This control method will now be described. The rendering application 201 selects the feature corresponding to the selected setting item based on the selection of the setting item for which the setting value is to be changed by the user.

The rendering application 201 reads out conflict information in the PDC 203. The conflict information including the feature corresponding to the setting item selected by the user is identified from the read conflict information.

In the identified conflict information, conflict information indicating the option that matches the currently set option is identified with reference to feature options different from the feature selected by the user. The rendering application 201 excludes options that conflict with the current setting from the options that can be selected in the feature corresponding to the setting item selected by the user based on the identified conflict information. The rendering application 201 displays the remaining options as options for the setting item selected by the user on the print setting screen.

This configuration enables the control processing to prevent a conflict from occurring even when the user changes the print setting by operating the print setting screen.

In addition to the above-described method, conflict information described in the PDC may also be used by the following method. For example, if the user sets a combination of setting values matching the conflict information on the print setting screen displayed by the rendering application 201 or the OS, the conflict may be resolved by changing one of the setting values to a default value. Additionally, a message for informing the user of the occurrence of a conflict may be displayed.

Other Embodiments

In the above embodiment(s), the "media-col-database" attribute is obtained as a combination of setting values that can be used in an inkjet printer to create the conflict list for the inkjet printer. A combination of setting values that is not included in the obtained "media-col-database" attribute is used as conflict information. Alternatively, the conflict information may be obtained from the inkjet printer. In this case, the conflict information obtained from the inkjet printer is directly added to the conflict list.

In the above-described embodiment(s), the conflict list creation processing to be executed is changed depending on whether the printing device 102 is an inkjet printer or a laser beam printer. The conflict list may be generated in the same manner, regardless of the printing method of the printing device 102. The conflict information described in the PDC may also be edited in the same manner, regardless of the printing method.

The present invention may also be implemented by executing the following processing. That is, software (program) for implementing functions according to the above-described embodiment(s) may be supplied to a system or apparatus via a network or various storage media, and a computer (or a CPU, a micro processing unit (MPU), etc.) of the system or apparatus reads out a program code. In this case, the computer program and storage media storing the computer program performing the features recited in one or more of the below claims may constitute the present invention.

According to the present invention, it may be possible to prevent display of a print setting screen with a combination of setting values that cannot be set to one print job on the print setting screen displayed by the extension application 204.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to above embodiment(s), it is to be understood that the invention is not limited to the disclosed exemplary embodiments. For example, the embodiments of the present invention described above can be implemented solely or as a combination of a plurality of the embodiments or features thereof where necessary or where the combination of elements or features from individual embodiments in a single embodiment is beneficial. The scope of the following claims is to be accorded the broadest interpretation so as to encompass all such modifications and equivalent structures and functions.

This application claims the benefit of Japanese Patent Application No. 2022-165310, filed Oct. 14, 2022, which is hereby incorporated by reference herein in its entirety.

What is claimed is:

1. A control method for an information processing apparatus storing a print setting application for displaying a print setting screen, the control method being implemented by executing the print setting application, the control method comprising:

obtaining capability information of a printing device and print method information of the printing device, the capability information including first information and second information, the first information being information regarding at least one function supported by an IPP (Internet Printing Protocol) Class Driver of an operating system of the information processing apparatus, the second information being information regarding at least one function not supported by the IPP Class Driver, the print setting application cooperating with the IPP Class Driver;

obtaining, in a case where the print method information indicates that the printing device is an inkjet printer, media-col-database from the printing device;

generating, in a case where the print method information indicates that the printing device is the inkjet printer, a conflict list based on the obtained media-col-database;

obtaining a print setting made via another print setting screen provided by software different from the print setting application, the obtaining being performed in response to a user instruction for displaying the print setting screen for managing at least one print setting corresponding to the second information, and the user instruction being executed via the another print setting screen for managing at least one print setting corresponding to the first information;

determining, in a case where the print method information indicates that the printing device is the inkjet printer, whether the obtained print setting includes a combination of setting values matching conflict information listed in the conflict list;

determining, in a case where the print method information indicates that the printing device is a laser beam printer, whether the obtained print setting includes a second combination of setting values matching conflict information preliminarily set in the print setting application;

changing the print setting in a case where it is determined that the print setting includes the combination of setting values or the second combination of setting values;

displaying the print setting screen, the changed setting values being set in the print setting screen.

2. The control method for the information processing apparatus according to claim 1, wherein the conflict information indicates a combination of a plurality of setting values that are prohibited from being set to one piece of print data.

3. The control method for the information processing apparatus according to claim 1, wherein the capability information and the print method information are obtained from the printing device.

4. The control method for the information processing apparatus according to claim 1, further comprising providing a notification about a setting item corresponding to the changed setting value in a case where the plurality of setting values set via the another print setting screen includes the combination of setting values matching the conflict information.

5. The control method for the information processing apparatus according to claim 1, wherein the IPP Class Driver is a printer driver compatible with printers provided by a plurality of vendors.

6. The control method for the information processing apparatus according to claim 1, wherein the conflict information is conflict information about a marginless printing function for printing an image without margins at sheet edges, and wherein information regarding the marginless printing function is included in the second information.

7. The control method for the information processing apparatus according to claim 1, wherein the print setting is obtained based on a notification received by the print setting application the an operating system of the information processing apparatus.

8. The control method for the information processing apparatus according to claim 1, wherein the print method information of the printing device is information regarding colorant.

9. The control method for the information processing apparatus according to claim 8, wherein the colorant includes at least one of ink or toner.

10. The control method for the information processing apparatus according to claim 1, wherein, in a case where the print method information of the printing device indicates that a print method of the printing device is inkjet printing, the conflict list is generated from media information obtained from the printing device.

11. An information processing apparatus storing a print setting application for displaying a print setting screen, the information processing apparatus comprising at least one processor operating to:

obtain capability information of a printing device and print method information of the printing device, the capability information including first information and second information, the first information being information regarding at least one function supported by an IPP (Internet Printing Protocol) Class Driver of an operating system of the information processing apparatus, the second information being information regarding at least one function not supported by the IPP Class Driver, the print setting application cooperating with the IPP Class Driver;

obtaining, in a case where the print method information indicates that the printing device is an inkjet printer, media-col-database from the printing device;

generate, in a case where the print method information indicates that the printing device is the inkjet printer, a conflict list based on the obtained media-col-database;

obtain a print setting made via another print setting screen provided by software different from the print setting application, the obtaining being performed in response to a user instruction for displaying the print setting screen for managing at least one print setting corresponding to the second information, and the user instruction being executed via the another print setting screen for managing at least one print setting corresponding to the first information;

determine, in a case where the print method information indicates that the printing device is the inkjet printer, whether the obtained print setting includes a combination of setting values listed in the conflict list;

determining, in a case where the print method information indicates that the printing device is a laser beam printer, whether the obtained print setting includes a second combination of setting values matching conflict information preliminarily set in the print setting application;

changing the print setting in a case where it is determined that the print setting includes the first combination of setting values or the second combination of setting values; and displaying the print setting screen, the changed setting values being set in the print setting screen.

12. A non-transitory computer-readable storage medium storing a print setting application for displaying a print setting screen, the print setting application cause an information processing apparatus to perform a control method comprising:

obtaining capability information of a printing device and print method information of the printing device, the capability information including first information and second information, the first information being information regarding at least one function supported by an IPP (Internet Printing Protocol) Class Driver of an operating system of the information processing apparatus, the second information being information regarding at least one function not supported by the IPP Class Driver, the print setting application cooperating with the IPP Class Driver;

obtaining, in a case where the print method information indicates that the printing device is an inkjet printer, media-col-database from the printing device;

generating, in a case where the print method information indicates that the printing device is the inkjet printer, a conflict list based on the obtained media-col-database;

obtaining a print setting made via another print setting screen provided by software different from the print setting application, the obtaining being performed in response to a user instruction for displaying the print setting screen for managing at least one print setting corresponding to the second information, and the user instruction being executed via the another print setting screen for managing at least one print setting corresponding to the first information;

determining, in a case where the print method information indicates that the printing device is the inkjet printer, whether the obtained print setting includes a combination of setting values listed in the conflict list;

determining, in a case where the print method information indicates that the printing device is a laser beam printer, whether the obtained print setting includes a second combination of setting values matching conflict information preliminarily set in the print setting application;

changing the print setting in a case where it is determined that the first print setting includes the combination of setting values or the second combination of setting values; and displaying the print setting screen, the changed setting values being set in the print setting screen.

* * * * *